(12) United States Patent
Willey et al.

(10) Patent No.: US 8,924,214 B2
(45) Date of Patent: Dec. 30, 2014

(54) RADAR MICROPHONE SPEECH RECOGNITION

(75) Inventors: Jefferson M Willey, Columbia, MD (US); Todd Stephenson, Washington, DC (US); Hugh Faust, Huntingtown, MD (US); James P. Hansen, Fairfax, VA (US); George J Linde, Accokeek, MD (US); Carol Chang, Falls Church, VA (US); Justin Nevitt, Bristow, VA (US); James A Ballas, Arlington, VA (US); Thomas Herne Crystal, Arlington, VA (US); Vincent Michael Stanford, North Potomac, MD (US); Jean W. De Graaf, Potomac, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 556 days.

(21) Appl. No.: 13/155,218

(22) Filed: Jun. 7, 2011

(65) Prior Publication Data

US 2012/0059657 A1 Mar. 8, 2012

Related U.S. Application Data

(60) Provisional application No. 61/352,139, filed on Jun. 7, 2010.

(51) Int. Cl.
| | | |
|---|---|---|
| *G10L 15/14* | (2006.01) | |
| *G10L 15/02* | (2006.01) | |
| *G01S 7/41* | (2006.01) | |
| *G01S 13/50* | (2006.01) | |
| *G01S 13/88* | (2006.01) | |

(52) U.S. Cl.
CPC ................. *G10L 15/02* (2013.01); *G01S 7/415* (2013.01); *G01S 13/50* (2013.01); *G01S 13/88* (2013.01)

USPC .......... 704/256; 704/246; 704/247; 704/251; 704/252

(58) Field of Classification Search
USPC .......................... 704/246, 247, 251, 252, 256
See application file for complete search history.

(56) References Cited

U.S. PATENT DOCUMENTS

| 6,006,175 | A | 12/1999 | Holzrichter | |
| 6,323,943 | B1 * | 11/2001 | Maruyama et al. | .......... 356/28.5 |
| 2003/0164792 | A1 * | 9/2003 | Jahangir et al. | ................. 342/90 |

(Continued)

OTHER PUBLICATIONS

Atal, B. S., and S. L. Hanauer, "Speech Analysis and Synthesis by Linear Prediction of the Speech Wave," J. Acoust. Soc. Amer., vol. 50, pp. 637-655, Aug. 1971.

(Continued)

*Primary Examiner* — Leonard Saint Cyr
(74) *Attorney, Agent, or Firm* — US Naval Research Laboratory; Kerry L. Broome

(57) ABSTRACT

A method for detecting and recognizing speech is provided that remotely detects body motions from a speaker during vocalization with one or more radar sensors. Specifically, the radar sensors include a transmit aperture that transmits one or more waveforms towards the speaker, and each of the waveforms has a distinct wavelength. A receiver aperture is configured to receive the scattered radio frequency energy from the speaker. Doppler signals correlated with the speaker vocalization are extracted with a receiver. Digital signal processors are configured to develop feature vectors utilizing the vocalization Doppler signals, and words associated with the feature vectors are recognized with a word classifier.

22 Claims, 20 Drawing Sheets

(56) References Cited

U.S. PATENT DOCUMENTS

| | | | |
|---|---|---|---|
| 2007/0194925 A1* | 8/2007 | Karr | 340/572.1 |
| 2008/0071532 A1* | 3/2008 | Ramakrishnan et al. | 704/233 |
| 2009/0292181 A1* | 11/2009 | Donaldson | 600/301 |
| 2010/0159866 A1 | 6/2010 | Fudge et al. | |
| 2010/0204991 A1* | 8/2010 | Ramakrishnan et al. | 704/246 |

OTHER PUBLICATIONS

Dempster, A. P., N. M. Laird, and D. B. Rubin, "Maximum likelihood from incomplete data via the EM algorithm," Journal of the Royal Statistical Society, Series B (Methodological), vol. 39, No. 1, pp. 1-38, 1977.

Nash, E. "Correcting Imperfections in IQ Modulators to Improve RF Signal Fidelity," Application Note AN 1039, Analog Devices, Inc., One Technology Way, P.O. Box 9106, Norwood, MA, 2009.

Rabiner, L. R., "A tutorial on hidden Markov models and selected applications in speech recognition," Proceedings of the IEEE, vol. 77, No. 2, pp. 257-285, Feb. 1989.

Shue, Y.-L., and M. Iseli, "The role of voice source measures on automatic gender classification," In the proceedings of the IEEE International Conference on Acoustics, Speech and Signal Processing, pp. 4493-4496, 2008.

Schwarz, P., P. Matjka, and J. Cernock, "Towards lower error rates in phoneme recognition," in Proceedings of 7th International Conference on Text, Speech and Dialogue, Berlin: Springer, p. 8, 2004.

L. E. Baum, T. Petrie, G. Soules, N. Weiss, "A maximization technique occuring in the statistical analysis of probabilistic functions in Markov chains," Annals of Mathematical Statistics, vol. 41, No. 1, pp. 164-171, 1970.

Parzen, E., "On estimation of a probability density function and mode," Annals of Mathematical Statistics, vol. 33, pp. 1065-1076, 1962.

Mingke Jiao, Guohua Lu, Xijing Jing, Sheng Li, Yanfeng Li, and Jianqi Wang, "A Novel Radar Sensor for the Non-Contact Detection of Speech Signals," Sensors (Basel), 10(5): 4622-4633, 2010, Published online May 4, 2010.

Ostry, David J., and K. G. Munhall, "Control of Rate and Duration of Speech Movements," Journal of the Acoustic Society of America, vol. 77, No. 2, pp. 640-648, Feb. 1985.

Munger, J. B., and S. L. Thomson, "Frequency Response of the Skin on the Head and Neck during Production of Selected Speech Sounds," Journal of the Acoustic Society of America, vol. 124, No. 6, pp. 4001-4012, Dec. 2008.

A.R. Toth, K. Kalgaonkar, B. Raj, and T. Ezzat, "Synthesizing speech from Doppler signals", in Proc. ICASSP, Mar. 2010, pp. 4638-4641.

* cited by examiner

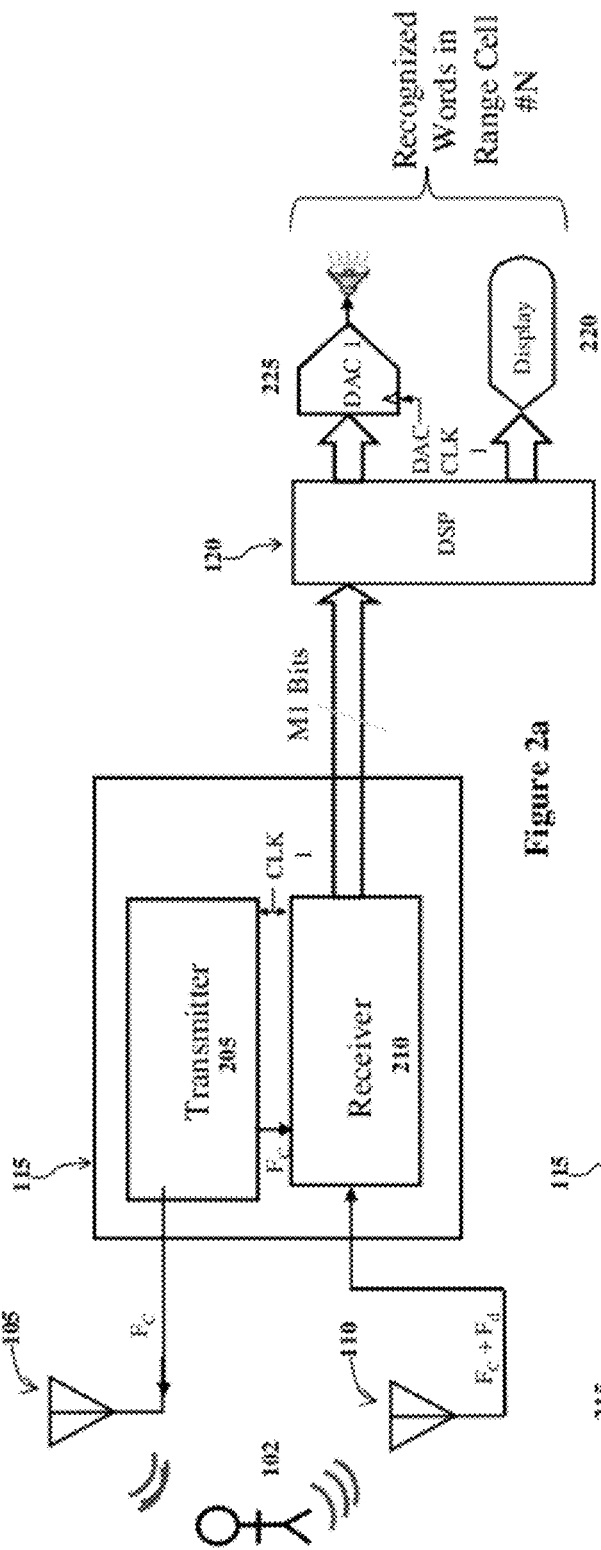
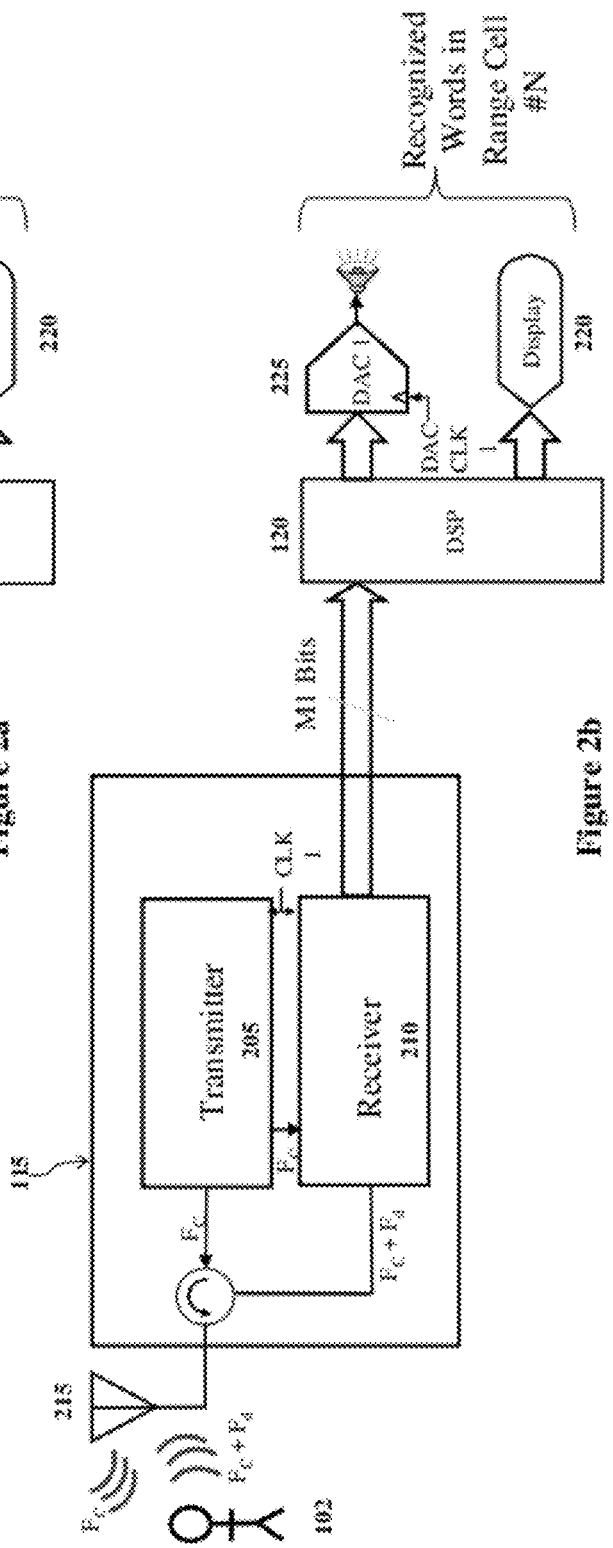

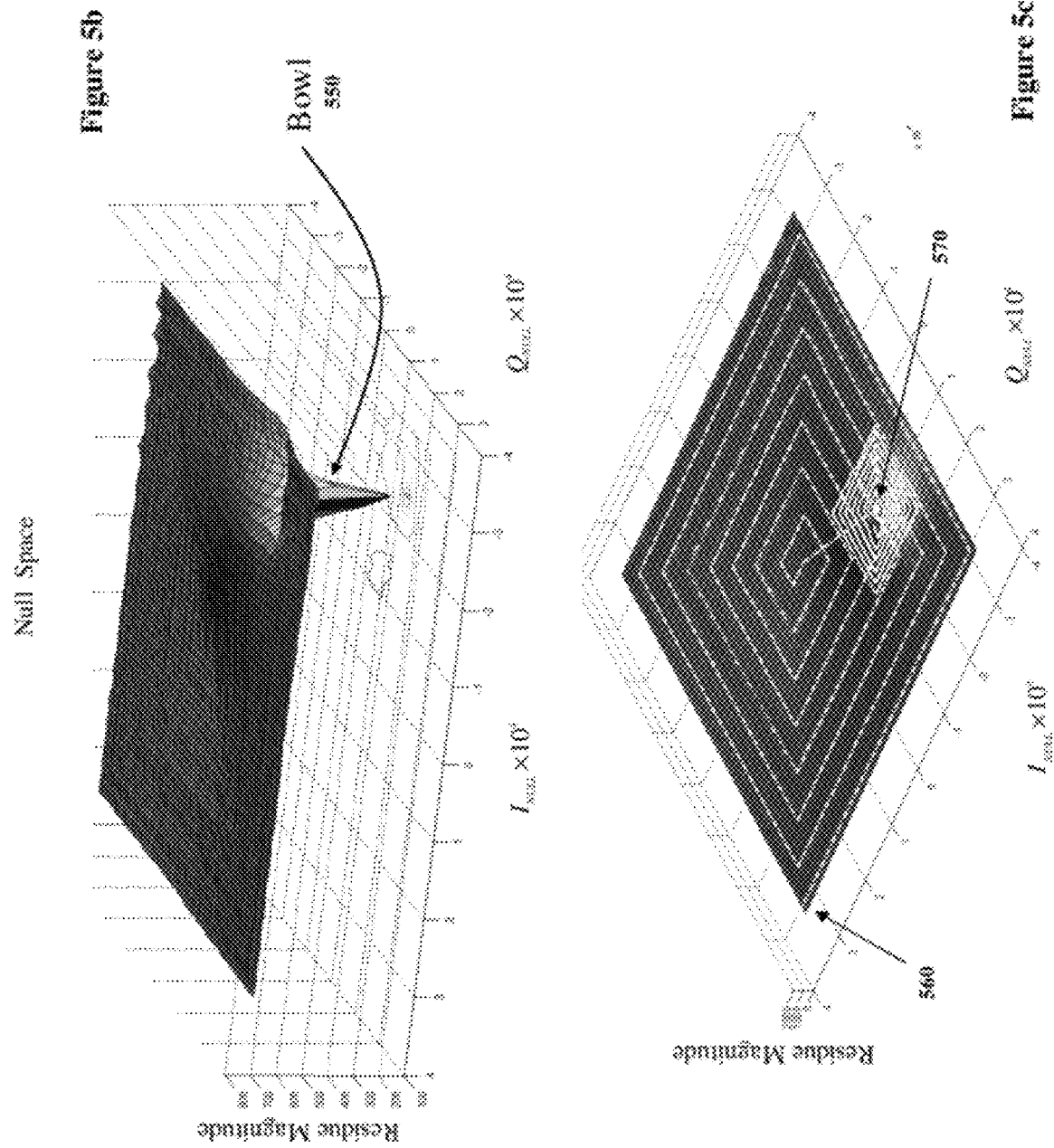

RADAR MICROPHONE SPEECH RECOGNITION

CROSS-REFERENCE TO RELATED APPLICATIONS

This application claims priority to U.S. Provisional Patent Application entitled, "Radar Microphone Speech Recognition," filed on Jun. 7, 2010, and assigned U.S. Application No. 61/352,139; the entire contents of which are hereby incorporated by reference.

FIELD OF THE INVENTION

The invention relates to a speech detection and recognition system. More specifically, the invention relates to a radar system and signal processor that enables remote speech detection and automatic speech recognition.

BACKGROUND

In the prior art, methods for detecting and sensing speech with radar typically include sensing the Doppler induced motions on artifacts that vibrate in the presence of an acoustic field driven by speech. However, as noted, these methods rely on the presence of acoustical fields to detect speech.

Accordingly, there remains a need for a system to remotely detect and automatically recognize speech derived solely from radio frequencies scattered by the human body during vocalization.

SUMMARY OF THE INVENTION

The invention satisfies the above-described and other needs by providing for a method for detecting and recognizing speech by remotely detecting body motions from a speaker with a radar sensor during vocalization. Next, Doppler signals correlated with the speaker vocalization can be extracted. Feature vectors utilizing the vocalization Doppler signals can then be developed, and words associated with the feature vectors can be automatically recognized with a word classifier.

For another aspect of the invention, a speech detection and recognition system can include one or more radar sensors configured to remotely detect body motions from a speaker during vocalization and to extract Doppler signals correlated with the speaker vocalization. One or more radar digital signal processors, connected to the radar sensors, can be configured to develop feature vectors utilizing the vocalization Doppler signals. One or more radar word classifiers configured to recognize words associated with the feature vectors.

These and other aspects, objects, and features of the present invention will become apparent from the following detailed description of the exemplary embodiments, read in conjunction with, and reference to, the accompanying drawings.

BRIEF DESCRIPTION OF THE DRAWINGS

FIG. 2a is a block diagram of a single wavelength radar microphone system in accordance with an exemplary embodiment of the invention.

FIG. 2b is a block diagram of single wavelength radar microphone system utilizing a single aperture implementation in accordance with an alternative exemplary embodiment of the invention.

FIG. 5b represents a sample graph of the Null Space response in accordance with an exemplary embodiment of the invention.

FIG. 5c represents a graph of a coarse and fine spiral scan method and its trajectory to locate the Best Null Vector in accordance with an exemplary embodiment of the invention.

DETAILED DESCRIPTION OF EXEMPLARY EMBODIMENTS

Figure 1:
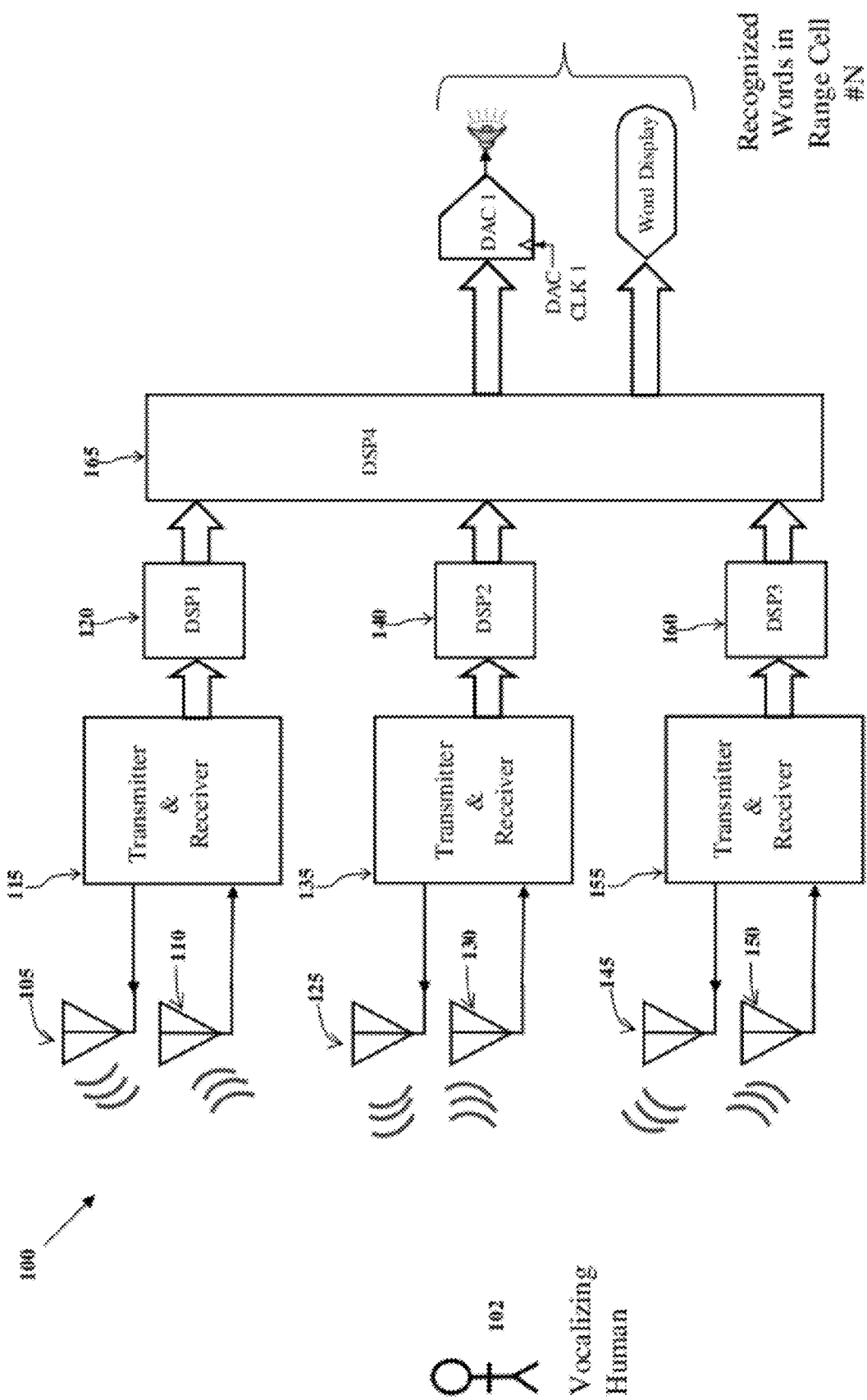
FIG. 1 is a block diagram of a tri-wavelength radar microphone system in accordance with an exemplary embodiment of the invention

Referring now to the drawings, in which like numerals represent like elements, aspects of the exemplary embodiments will be described in connection with the drawing set.

To overcome the limitations of the prior art, a radar microphone system can be developed that enables remote speech detection and recognition of speaker dependent isolated words at distances remote to the human body, as well as under non-visible conditions, such as through some building materials and adverse weather such as fog. In general, the radar microphone system was enabled by the development of components to address issues and limitations in at least three areas, summarized briefly below.

A first area addressed in developing this exemplary radar microphone system is the ability of sensing the small motions on the human body that are correlated with vocalization, i.e., speech, with an active electromagnetic sensor, such as a radar sensor. When humans speak, some small, e.g., micron order, vibrational displacements of human skin and body tissues occur, as well as larger displacements associated with articulator, e.g., jaw, lips, cheek, and mouth motions. However, the detection of small signals in the presence of large signals is limited by the dynamic range of the radar's analog circuitry. Dynamic range can be a severe constraint as the measured radio frequency (RF) energy scattered by the human body associated with vocalization is many orders of magnitude smaller than the RF energy scattered from the non-vocalizing parts of the human body.

In an exemplary embodiment of the invention, the dynamic range constraint can be overcome by an exemplary adaptive analog clutter cancellation, or nulling, circuit. Large interfering signals from the non-vocalizing parts of the human body can drive the receiver circuit into deep saturation forcing the receiver to operate in a non-linear regime. The canceller circuit can be driven digitally to locate a suitable minimum in the non-convex space formed by the canceller residue. The receiver circuit's linear property can then be recovered, enabling detection of the small magnitude Doppler signals associated with vocalization.

When a human is illuminated with an ultrasensitive Doppler radar, some of the RF energy modulated by human body motions associated with speech can be scattered towards a collection aperture and receiver. The coherent receiver can extract Doppler signals correlated with isolated words, and can develop features that can be recognized by a machine classifier as isolated words. The words can then be presented both aurally and as text.

A second problem area is phenomenology exploitation. In testing results, measured data typically shows that the RF energy correlated with the acoustic speech spectrum is highly attenuated in frequency support. Furthermore, the RF-derived baseband signal has little to no RF energy associated with unvoiced speech components compared to voiced speech components above 100 Hz in the baseband signal. Consequently, a human who listens to an aural presentation of the RF-derived baseband signal deems it unintelligible. Therefore, machine-based speech recognition systems, trained with classical cepstral domain features, typically yield relatively poor performance. To address this problem, and to compensate for the missing unvoiced speech sounds, exploitation of artifacts in the radar derived data associated with articulator, e.g., jaw, cheek, mouth, lip, motions were used to augment the feature vector. The exploitation of these artifacts in the radar led to improved isolated word recognition.

Furthermore, it was understood that the observed RF phenomenology is a function of the RF wavelength used for illumination, the 3-D orientation of the vocalizing human relative to the radar, and other factors. At short wavelengths, e.g., 0.3 cm, the speech-correlated features in the frequency domain tend to have higher signal-to-noise ratios compared to longer wavelengths. On the other hand, at longer wavelengths, e.g., 17.0 cm, the magnitudes of speech-correlated features tend to vary less with changes in 3-D orientation. Therefore, near simultaneous measurements at three diverse wavelengths, e.g., at 17.0 cm, 3 cm, and 0.3 cm, show that the speech-correlated features, when aggregated across all three wavelengths, tend to complement each other. Some speech-correlated features absent at one wavelength, e.g., 3.0 cm, can frequently appear at another wavelength, e.g., 0.3 cm, and vice-versa. Therefore, a system's speech recognition can be improved by combining information from three diverse wavelengths, e.g., 17.0 cm, 3.0 cm, and 0.3 cm, compared to a single wavelength system.

A third area addressed by an exemplary embodiment of the invention was signal processing and classification. RF detection of speech-correlated vibrations on the human body, associated with voiced speech components, is unlike classical RF Doppler signals. The human skin vibration displacements are typically 2 to 4 orders of magnitude smaller than typical RF wavelengths. Instead of a continuous rotation rate of the signal vector in the IQ space associated with a true Doppler signal, the small vibratory related signals appear as small, sub $2\pi$, pendulum-like oscillations in the IQ space. The result is that the magnitude of the Fourier coefficients are many dB smaller than an equivalent magnitude signal making a full $2\pi$ rotation in the IQ space. The visibility of these weak signals is highly dependent on the clutter cancellation circuit.

In the classical acoustic domain, i.e., frequencies >100 Hz offset relative to the RF carrier, classical acoustic features such as Mel-scaled frequency cepstral coefficients (MFCCs) yield poor speech recognition rates. This poor performance is typically due to the severe attenuation of unvoiced speech components as well as to the severely limited frequency support seen in many human subjects. Therefore, to increase the probability of correct speech recognition, low frequency, i.e., <50 Hz, spectral features, which are typically observed to be dominated by articulator artifacts and thus serving as cues for unvoiced sounds, complement the vector of features used to train machine classifiers. The results can lead to dramatically improved speech recognition rates.

FIG. 1 is a block diagram of a tri-wavelength radar microphone system 100 in accordance with an exemplary embodiment of the invention. The system 100 can include three coherent Doppler radar systems 115, 135, and 155. The three coherent Doppler radar systems 115, 135, and 155 can each include a transmitter and receiver. More specifically, Doppler radar systems 115, 135, and 155 can include a combination of an analog RF front end with a digitally controlled analog clutter cancellation circuit. FIG. 2a is a block diagram of a single wavelength radar microphone system in accordance with an exemplary embodiment of the invention. FIG. 2a will be utilized to illustrate the components of the radar microphone system in a simpler format, using just a single wavelength design instead of the three-wavelength design of FIG. 1. However, one of ordinary skill in the art will understand that a radar microphone system can be designed to operate with more than one wavelength, e.g., three wavelengths, with similar hardware components.

The Doppler radar system 115 in FIG. 2a includes transmitter 205 and receiver 210. Each of the Doppler radar systems 115, 135, and 155 can each transmit a short pulse waveform at a distinct wavelength, λ. For example, Doppler radar system 115 can transmit at λ1, Doppler radar system 135 can transmit at λ2, and Doppler radar system 155 can transmit at λ3. In one embodiment of the invention, λ1=0.3 cm, λ2=3.0 cm, and λ3=17.0 cm. The short pulse waveforms can be transmitted through a transmit aperture 105, 125, and 145 associated with each Doppler radar system 115, 135, and 155 towards a vocalizing human 102.

Each of the Doppler radar systems 115, 135, and 155 can also include an associated receiver aperture 110, 130, and 150. After the short pulse waveforms (i.e., λ1, λ2, and λ3) are transmitted towards the human 102, some of the scattered radio frequency (RF) energy can be collected by the associated receive apertures 110, 130, and 150. In FIG. 2a, the RF energy collected by receiver aperture 110 can be coherently received by the receiver 210.

In an alternative embodiment, a single aperture 215 implementation can also be utilized, wherein the single aperture can transmit waveforms towards a speaker and receive the scattered radio frequency energy in return. FIG. 2b is a block diagram of single wavelength radar microphone system utilizing a mono-static (i.e., single aperture) implementation in accordance with an alternative exemplary embodiment of the invention.

Next, the receiver 210 can generate an intermediate frequency (IF), which can be oversampled (M1 bits), and sent to a digital signal processor (DSP) 120. DSP 120 can digitally generate baseband quadrature signals, convert the signals to the frequency domain, extract speech-correlated features, perform machine based speech recognition, and generate a word decision. The output from DSP 120 can be a word decision that can be represented as ASCII and as a digitized synthetic speech waveform on a display 220. The digital speech waveform can be fed to digital-to-analog converter (DAC 1) 225 for conversion to an analog signal for aural presentation.

The radar microphone radio frequency circuit can be designed for low phase noise and significant dynamic range to sense the small magnitude skin vibrations and articulator motions. In an exemplary embodiment of the invention, implementation of those objectives is the offset Homodyne circuit, with the addition of a feedback circuit to perform analog clutter cancellation, increasing the effective dynamic range of the receiver.

Figure 3:
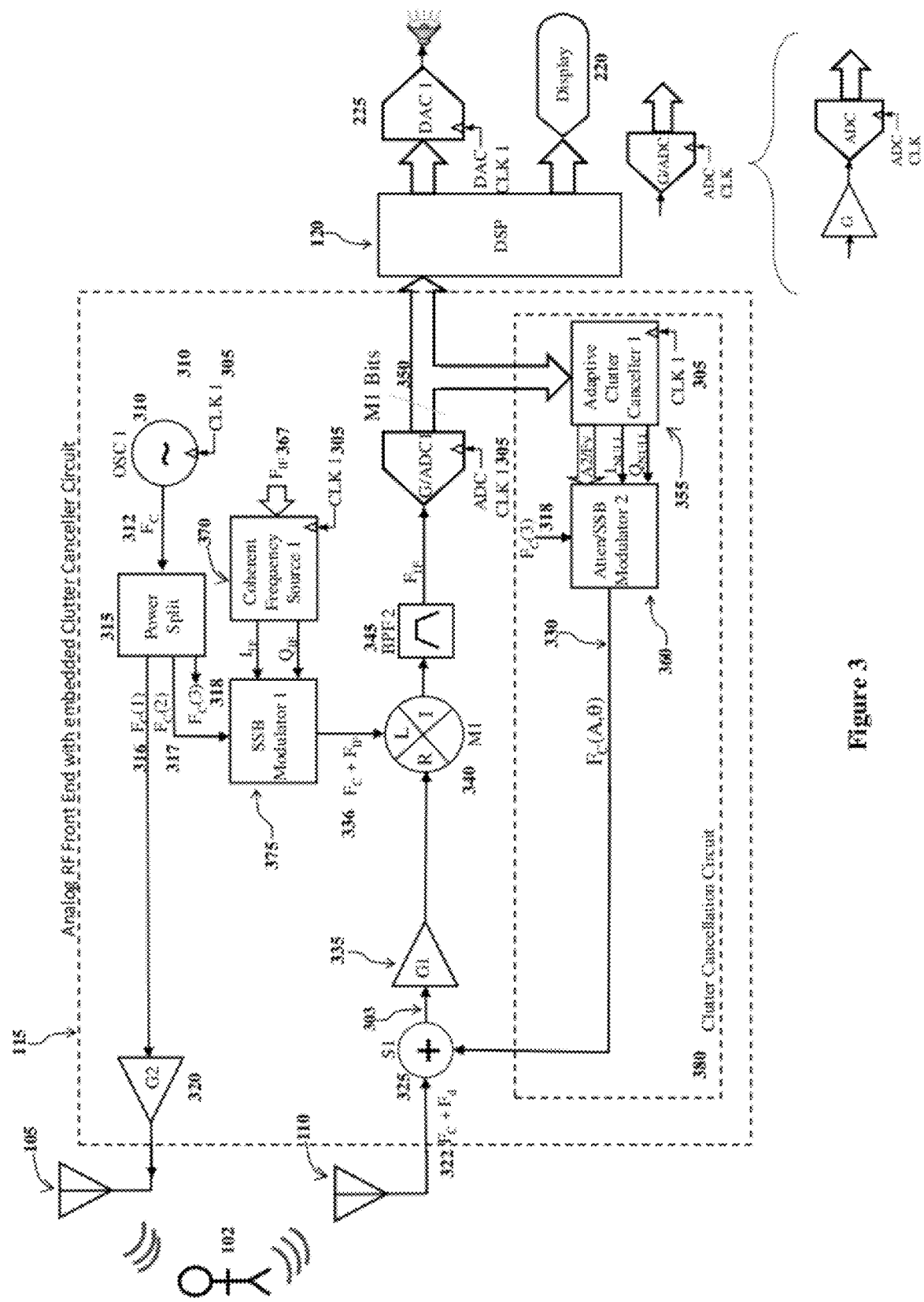
FIG. 3 is a circuit diagram of an analog RF front end with an embedded clutter cancellation circuit for a single wavelength continuous wave radar microphone in accordance with an exemplary embodiment of the invention.

FIG. 3 is a circuit diagram of an analog RF front end 115 that includes an embedded clutter cancellation, or nulling, circuit 380 for a single wavelength continuous wave (CW) radar microphone in accordance with an exemplary embodiment of the invention. An external low phase noise external clock (CLK 1) 305 can be employed as the common phase reference for all the analog and digital signal sources employed in the RF transmitter and receiver. The phase locked referenced low phase noise oscillator (OSC 1) 310 can generate a carrier, $F_c$ 312. This signal can be power split 315 three ways into $F_c(1)$ 316, $F_c(2)$ 317, and $F_c(3)$ 318. $F_c(1)$ 316 can be amplified by a low noise amplifier 320 with net gain G2 and sent to the transmission aperture 105.

During vocalization, the human skin and tissue motions can Doppler modulate the electromagnetic waves producing a frequency modulation of $F_c+F_d$. Some of the electromagnetic energy can be scattered back towards a receive aperture 110. The electrical signal from the antenna, $F_c+F_d$ 322, can be summed (S1) 325 with a clutter nulling feedback signal 330. The summed result can then be coupled to a low noise figure amplifier 335, and then down-converted by mixing (M1) 340 the $F_c+Fd$ signal with a single sideband modulated signal, $F_c+F_{IF}$ 336, and then band pass filtered (BPF2) 345 around $F_{IF}$. The IF signal can be oversampled 350 (M1 bits) at 4 times $F_{IF}$ and transferred to a digital signal processor (DSP) 120 for quadrature recovery, feature extraction, and speech recognition.

The oversampled IF signal 350 can also be transferred to the adaptive clutter canceller algorithm 355 that can generate a null signal magnitude and phase (as the analog signals $I_{NULL}$, $Q_{NULL}$) with digital control words (A2, $F_v$). These signals can drive an attenuator and single sideband modulator 360 to modulate a sample of the transmitted signal, $F_c(3)$ 318, generating a nulling signal, $F_c(A,\theta)$ 330, that can be fed back to the summer 325. The objective of the feedback signal is to highly attenuate the clutter signal prior to the low noise amplifier 335.

The effect of the circuitry in FIG. 3 is that after the clutter cancellation circuit 380 has reached a steady state, the clutter signal can effectively be cancelled. Therefore, the small Doppler signals (i.e., $F_d$) can become visible.

Figure 4:
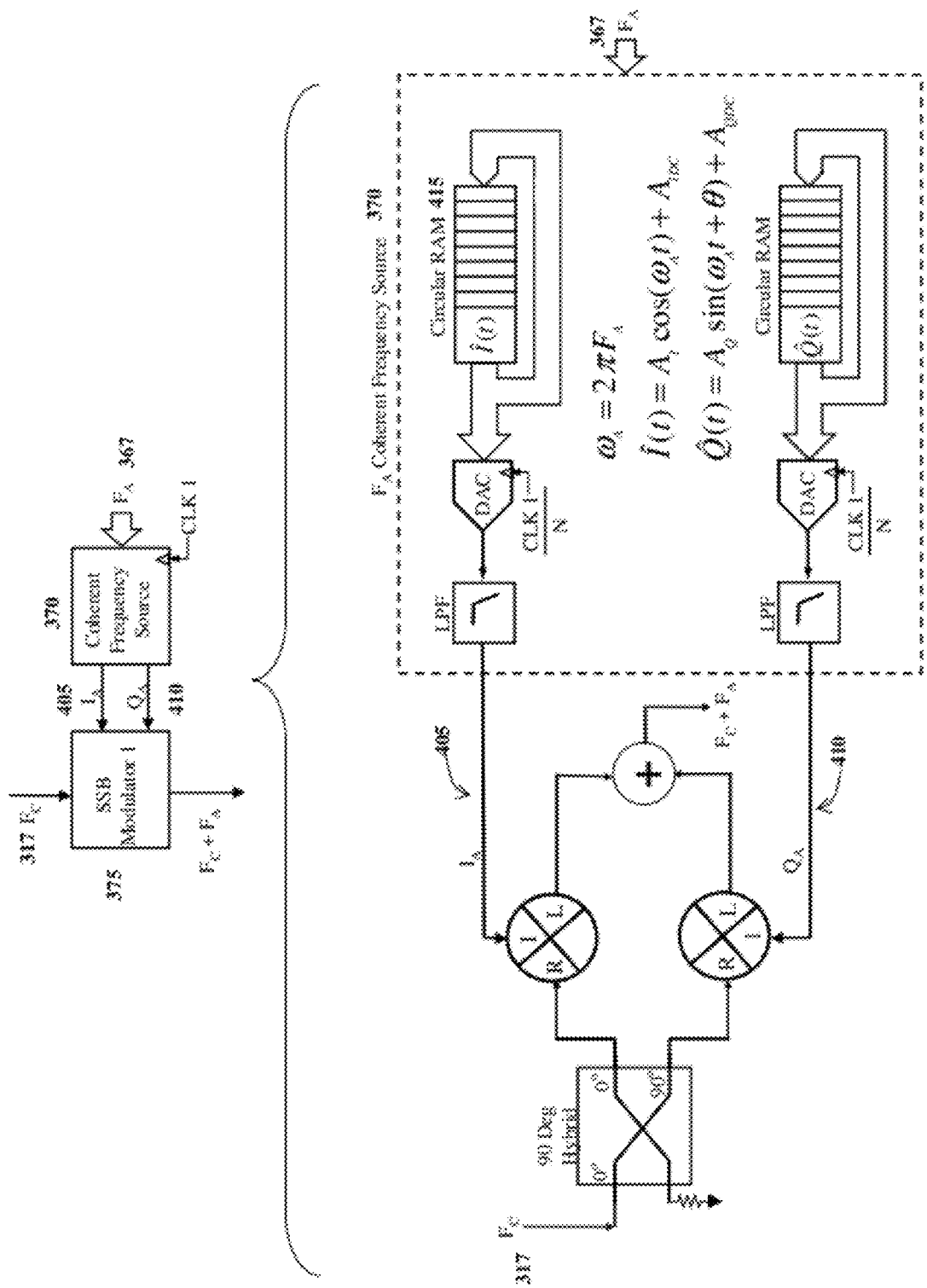
FIG. 4 is a block diagram representing a low phase noise single sideband modulation of the carrier, $F_c$, to $F_c+F_{IF}$ in accordance with an exemplary embodiment of the invention.

FIG. 4 is a block diagram representing a low phase noise single sideband modulation of the carrier, $F_c$ 317, to $F_c+F_{IF}$ in accordance with an exemplary embodiment of the invention. In an exemplary embodiment of the invention, a pure tone can be produced by the single sideband modulator 375 at $F_c+F_{IF}$, and both the leakage of the carrier at $F_c$, and the image at $F_c-F_{IF}$ are well below the phase noise skirts and thermal noise of the $F_c$.

The general implementation of the single sideband modulator 375 can be accomplished by mixing the $F_{IF}$ 367, or $F_A$ as shown in FIG. 4, quadrature signals, in-phase $I_A$ 405, and quadrature $Q_A$ 410, with a power split sample of the carrier, $F_c$, and a 90 degree sample of $F_c$, with power summation to produce a single tone at $F_c+F_A$ as shown in FIG. 4. If all the analog circuit components are ideal with no mismatch in phase or magnitude then the quadrature drive components are:

$$I(t)=A\cos(w_A t)$$

$$Q(t)=A\sin(w_A t)$$

$$w_A=2\pi f_A.$$

However, imperfections or departures of analog circuit components from their ideal specifications (e.g., ADCs, mixers, 90-degree hybrid, RF path length differences, etc.) are equivalent to mismatches in phase and amplitude of the two quadrature channels, resulting in significant energy at the image frequency, $F_c-F_A$. It is well known to one of ordinary skill in the art that some of the mismatches can be compensated for by manipulation of the phase and magnitudes of the quadrature drive channels:

$$I(t)=A_I\cos(w_A t)$$

$$Q(t)=A_Q\sin(w_A t+\theta).$$

One calibration strategy known to one of ordinary skill in the art minimizes the image frequency, $F_c-F_A$, by gradient descent of the image power with respect to $A_I$, $A_Q$, and $\theta$. In an exemplary embodiment of this invention, an additional compensation can be employed to cancel the carrier leakage at the RF ports of the mixers by incorporating a DC calibration term:

$$I(t)=A_I\cos(w_A t)+A_{IDC}\cos(w_{DC}t)$$

$$Q(t)=A_Q\sin(w_A t+\theta)+A_{QDC}\sin(w_{DC}t+\theta_{DC}).$$

Since $w_{DC}=0$, $$I(t) = A_I \cos(w_A t) + A_{IDC}$$

$$Q(t) = A_Q \sin(w_A t + \theta) + A_{QDC},$$

where the $A_{IDC}$ and $A_{QDC}$ terms have bi-polar permissible ranges. After initial calibration of the AI, $A_Q$, $\theta$, $A_{IDC}$, and $A_{QDC}$ terms, both the nuisance image frequency at $F_c - F_A$ and the carrier leak through of $F_c$ are highly attenuated with respect to the desired sideband signal at $F_c + F_A$. The time domain sequence can be oversampled and stored in memory with the number of samples equivalent to an integer number of $2\pi$ cycles of $F_A$. This process can eliminate the phase discontinuity on the continuous circular readout of the stored quadrature data (shown as the circular RAM 415 shown in FIG. 4).

Figure 5A:
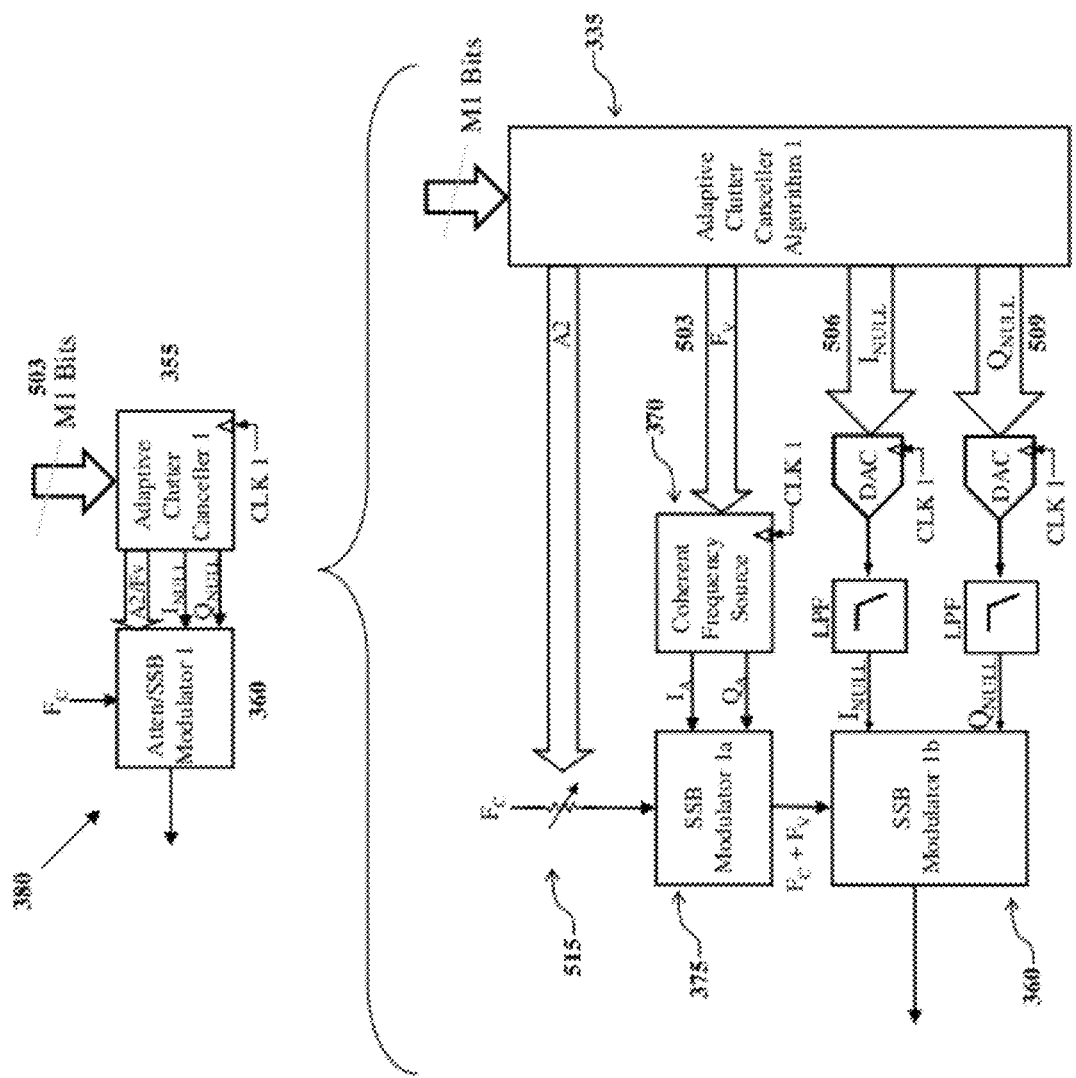
FIG. 5a is a block diagram representing a clutter cancellation circuit in accordance with an exemplary embodiment of the invention.

In FIG. 3, the adaptive clutter canceller algorithm 355 can develop drive signals for the attenuator and single sideband modulator 360 to generate a signal that ultimately is close to antipodal to the clutter signal. FIG. 5a is a block diagram representing a clutter canceller, or nulling, circuit 380 in accordance with an exemplary embodiment of the invention. In FIG. 5a, an oversampled IF signal of M1 bits 503 is streamed into an adaptive clutter canceller algorithm 335. The signal can be converted to baseband and digitally filtered, at low latency, to estimate the clutter, i.e., residue, magnitude and mean frequency $F_v$ 503. $F_v$ 503 can be supplied to a coherent frequency source 370 and SSB modulator 1a 375 to generate a tone at $F_c + F_v$. The 370 and 375 circuits were previously described with respect to FIG. 4. The adaptive clutter canceller algorithm 355 can determine a suitable attenuation level for $F_c + F_v$ and can develop digital values of ($I_{NULL}$ 506, $Q_{NULL}$ 508). The latter can be converted to analog bipolar signals which can drive the SSB Modulator 1b 360 to manipulate the magnitude and phase of the nulling signal 330.

The goal of the adaptive clutter nulling circuit 380 is to produce a signal that is antipodal to the clutter signal. In the prior art, attempts have been made to directly estimate the magnitude and phase of the clutter signal and calculate the antipodal null signal components directly. The disadvantages with this approach are numerous. For example, the receiver's dynamic range is assumed sufficient to encompass the range of the clutter and Doppler signals completely and simultaneously. Additionally, the receiver circuit's gain and phase transfer function must be estimated with high precision, and that both functions are time-invariant. These two disadvantages have an implicit assumption that the RF circuit is strictly linear in its response.

The receiver's dynamic range problem is considered first. For the radar microphone application discussed herein, the dynamic range required to sense both the large clutter and the low magnitude and low frequency speech and articulator correlated signals from the human body greatly exceeds what can be realized in prior art component hardware. The key problem is the very large clutter magnitude. In the prior art, it might be argued that a high Q notch filter, where the notch center is set to the center of the clutter frequency spectrum would be a possible design strategy. However, in the application of the invention and its preferred operating wavelengths, prior art tunable high Q filters do not have a sufficient Q to pass the low offset frequency signals conveying some of the articulator information. Therefore, in an exemplary embodiment of the invention, a feedback circuit, comprised of commercial off-the-shelf (COTS) hardware can be designed that can cancel the clutter signal before the first active circuit component, the low noise amplifier 335.

The receiver's non-linearity problem is considered next. For some time intervals (start-up or after a magnitude or phase change of the clutter signal), the feedback signal will not cancel the clutter signal, resulting in a large magnitude clutter signal at the output of the summer 325 which presents itself as a very large signal to the input of downstream circuit components. The large magnitude signal driving a circuit with high gain can drive the circuit components (i.e., amplifiers, mixers, ADCs) well beyond compression and into deep saturation. The result is that the linearity assumption is violated; therefore, accurate estimations of the phase and magnitude of the clutter signal are not possible.

One of ordinary skill in the art might argue that for the time intervals where the signal level 303 is well below the linear compression point of the receiver (P1dB), it might be possible to calibrate the receiver transfer function to predict its linear response, i.e., the linear transfer function, and enable direct calculation of the clutter magnitude and phase. In any circuit embodiment, the measurements of the in-phase and quadrature components will have finite quantization and measurement errors that will limit the clutter cancellation performance. Furthermore, for short carrier wavelengths, the circuit's phase response may not be time stationary, resulting in significant phase errors, which can also limit cancellation performance.

The major challenges of the clutter cancellation algorithm 335 include the non-linear response of the receiver with respect to linear changes in the null vector, and the time dynamics associated with establishing and maintaining the clutter cancellation. To overcome this problem a Null Space must be defined and a methodology must be considered to locate a satisfactory null vector.

In an exemplary embodiment of the invention, the Null Space can be defined as the residue magnitude, i.e., the power at 303 in FIG. 3, versus the $I_{NULL}$ and $Q_{NULL}$ values taken over a small time interval where the clutter signal is assumed to have little variation. FIG. 5b represents a graph of the Null Space response defined by the clutter cancellation algorithm 335 of FIG. 5a in accordance with an exemplary embodiment of the invention. Specifically, the sample graph in FIG. 5b represents the residue magnitude versus ($I_{NULL}$, $Q_{NULL}$) at $\lambda=3.0$ cm. The vector position can be defined where the clutter signal is exactly cancelled as the "Optimal Null Vector," ($I_{NULL\_OPT}$, $Q_{NULL\_OPT}$), and define the "Best Null Vector" ($I_{NULL\_BEST}$, $Q_{NULL\_BEST}$) as the vector position with minimum residue magnitude obtained with the practical clutter nulling circuit and algorithm. Finally, the small neighborhood surrounding the Optimal Null Vector, where the residue magnitude is below the P1 dB point, can be defined as the Bowl 550 containing the Best Null Vector.

The Bowl position and the Best Null Vector in the radar microphone's Null Space are non-stationary, and both will change when the phase and magnitude of the clutter, the non-vocalizing part of the human and non-human external clutter, change. Therefore, an exhaustive search of the Null Space to locate the Best Null Vector can easily exceed the clutter decorrelation time, which means an alternative method is required.

The circuit's limited dynamic range and resulting non-linear response requires non-gradient methods to locate the optimal null vector when the initial conditions are well outside the Bowl. Stochastic optimization methods, including Monte Carlo and Simulated Annealing, can be suitable methods for searching non-convex surfaces such as those typically found in the radar microphone's Null Space; however, stochastic techniques are not guaranteed to locate the Bowl, much less the Best Null Vector, in finite time.

An alternative embodiment can be to employ a coarse grid scan to locate the Bowl, wherein the coarseness of the grid is proportional to the expected Bowl radius. Once the Bowl has been located, gradient descent with regularization can be employed to find the Best Null Vector. In another alternative embodiment, a second fine grid scan can be performed to locate the Best Null Vector. An exemplary embodiment, which employs two successive spiral scans, can provide a deterministic and guaranteed maximum time required to search the Null Space. In summary, FIG. 5c represents a graph of a coarse/fine spiral scan method and its trajectory to locate the Best Null Vector in accordance with an exemplary embodiment of the invention. First, a coarse spiral scan starts with a large magnitude null vector on the outside edge of the Null Space, such as at location 560, and spirals inward, decrementing the magnitude of the null vector after each orbit. The null vector position corresponding to the smallest residue obtained during the descending orbit can be the estimated Bowl position. A fine spiral scan can then be started at the estimated Bowl position, such as at location 570, followed by an outward spiral to a preset maximum Euclidean distance of the null vector relative to the estimated Bowl position. The minimum residue magnitude across the fine spiral scan can be declared as the Best Null Vector. Once the coarse and fine spiral scans have been completed, the $I_{NULL}$ and $Q_{NULL}$ can be set to the Best Null Vector.

The ability to locate a satisfactory null vector position is a function of the dynamic range of the nulling signal, the granularity of the coarse and fine spiral orbits, and the radius of the Bowl. Next, setting the peak power of the nulling signal can be determined. The peak null signal magnitude can be established by the attenuator 515 as applied to the sample of $F_c(3)$:

$$\text{null signal peak magnitude} = |F_c(3)|10^{\left(\frac{-A2\_dB}{20}\right)}$$

The magnitude of $F_c(3)$ establishes the upper limit of the input clutter power that the radar microphone receiver can cancel and is independent of the P1dB of the radar microphone receiver without the canceller feedback circuit in place.

The dynamic range, relative to the peak power, can be 6 Nbits dB where Nbits is the effective number of bits in the ($I_{NULL}$, $Q_{NULL}$) nulling signal. The null signal magnitude ($I_{NULL}$, $Q_{NULL}$) for a given A2_dB is:

$$\text{null signal peak magnitude} = |F_c(3)|10^{\left(\frac{-A2\_dB}{20}\right)} \left( \frac{\sqrt{I\_NULL^2 + Q\_NULL^2}}{\sqrt{\max\_I\_NULL^2 + \max\_Q\_NULL^2}} \right),$$

where max_I_NULL is the maximum amplitude of the I_NULL signal. The least significant bit (LSB) can establish the quantization of the Null Space:

$$LSB \text{ magnitude} = |F_c(3)|10^{\left(\frac{-A2\_dB}{20}\right)} 2^{-Nbits}$$

The LSB magnitude must be less than the Bowl diameter to guarantee detection of the Bowl.

The adaptive nulling circuit/algorithm can set the peak power, by digital control word A2, by the Estimate Attenuation (EMA) algorithm. The algorithm's objective is to set the attenuation control to force the Best Null Vector position to lie within an annulus. The annulus is the region bounded by two circles in the Null Space between minimum and maximum permissible values of the null vector magnitude. The magnitude of the Best Null Vector is:

Min Null Vector Magnitude ≤ $\sqrt{I\_NULL\_BEST^2 + Q\_NULL\_BEST^2}$ < Max Null Vector Magnitude When the Best Null Vector position lies within this annulus, the attenuator control is invariant to large changes in clutter phase, minimizing the need to change the attenuation control. When the Best Null Vector magnitude exceeds the Max Null Vector Magnitude, some small changes in the phase of the clutter signal map to regions in the null space that are not admissible by ($I_{NULL}$, $Q_{NULL}$); the remedy can be to increase the attenuation. When the Best Null Vector magnitude is below the Min Null Vector Magnitude, the dynamic range can be reduced ($<<2^{-Nbits}$) increasing the likelihood that the Bowl may not be found when there is a change in the phase of the clutter signal. The strategy can then be to decrease the attenuation. If the Best Null Vector position falls within the annulus, then the attenuation is not changed, and the EMA algorithm exits.

For an example of how the EMA algorithm can operate, at startup the A2 attenuation fed into the attenuator 515 is initially 0. A coarse/fine spiral scan is run, and the magnitude of the Best Null Vector is found to exceed the Max Null Vector Magnitude. Therefore, the EMA algorithm increments the attenuation by 6 dB, and another coarse/fine spiral scan can be performed. After the second scan, the EMA algorithm can determine that the magnitude of the Best Null Vector is found to lie within the annulus of acceptable Null Vector magnitudes so the A2 attenuation remains at 6 dB, and the EMA algorithm exits.

After a satisfactory attenuation A2 has been set by the EMA algorithm, the Maintain Null Position (MNP) algorithm can be invoked. The goal of the MNP algorithm is two-fold: (1) to keep the residue power level well within the receiver's linear dynamic range; and (2) to minimize changes in the null vector position. The motivation for the latter is to avoid artifacts and transients that can occur when injecting different ($I_{NULL}$, $Q_{NULL}$) signals.

The MNP algorithm can continuously monitor the residue power. If the residue power exceeds the Residue High Threshold continuously for a time interval of MNP_dT milliseconds, then a Coarse/Fine spiral scan can be performed. If the residue magnitude at the conclusion of the Coarse/Fine spiral scan is below the Residue High Threshold, then the algorithm can passively monitor the residue power until it exceeds the threshold and time criteria. If, at the end of the scans, the residue magnitude still exceeds the Residue High Threshold, then the EMA algorithm can be invoked.

For an example of how the MNP algorithm can operate, the algorithm monitors the residue power, and the residue magnitude stays above the Residue High Threshold for 37.5 ms before the coarse/fine spiral scans are initiated. As both the EMA and MNP algorithms activate the coarse/fine spiral scans, the time interval of each coarse/fine spiral scan activation is stored. The EMA and MNP activations of the null vector scans are stored as "mode history" with unique symbols associated with each state. The sequence of start and stop times of each coarse/fine scan activation can be stored as vectors, $t_{NULL\_STARTs}$ and $t_{NULL\_STOPs}$, for later use by the feature extraction algorithm to interpolate the frequency domain data across the marked intervals. The marked intervals indicate where the receiver signal may be contaminated with nulling signal artifacts.

The nulling algorithm can be a continuous loop of the EMA algorithm and the MNP algorithm. From powering on the radar microphone, the EMA algorithm can be performed, then the MNP algorithm, and then the EMA algorithm can be performed again, and the algorithm can maintain a continuous loop. The critical parameters of the EMA algorithm, i.e., High Residue Threshold, $A2_{Increase}$, $A2_{Decrease}$, are functions of the receiver's linear dynamic range for the specific $\lambda$. The MNP_dT time interval for the MNP algorithm is a function of the human RCS time constants during vocalization obtained during training.

In summary, while the receiver is operating in non-linear, or hard, saturation a method can be provided to attenuate the clutter signals with the clutter nulling feedback circuit that includes a clutter nulling algorithm. First, the dynamic range of the clutter nulling circuit can be adapted to an interfering signal level. Next, the non-convex null space of the receiver can be searched for a bowl where the receiver behaves linearly. Finally, a region within the bowl that maximizes the clutter attenuation can be identified.

Figure 6:
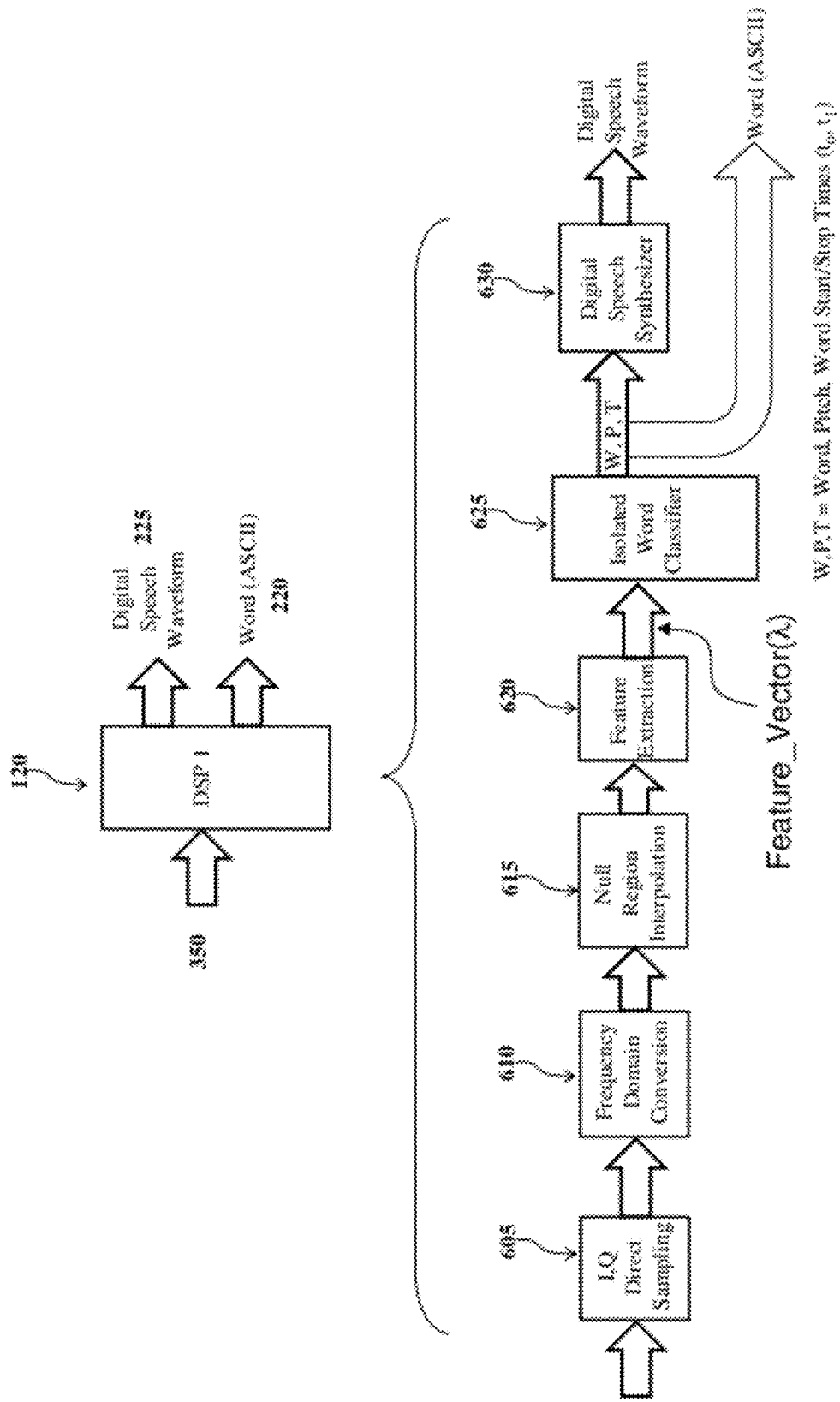
FIG. 6 is a block diagram representing the functions of a digital signal processor in accordance with an exemplary embodiment of the invention.

FIG. 6 is a block diagram representing the functions of a digital signal processor 120 in accordance with an exemplary embodiment of the invention. Specifically, with reference to FIG. 6, the signal processing, feature-extraction isolated-word classification, and speech synthesis functions of the DSP 120 will be discussed. The input to the DSP 120 can consist of the digitally sampled IF 350, the residue signal after clutter cancellation. The output can be a word symbol on a display 220 and a synthetic digital speech waveform 225 presented aurally.

In an exemplary embodiment of the invention, each function in FIG. 6 may be realized as software, or as a combination of field programmable gate arrays (FPGA) and software. The first two functions 605 and 610 can be pre-processing functions required to generate coherent frequency-domain data. In 605, the IF signal can be oversampled at 4 times the IF frequency for direct I,Q conversion to baseband. Next, in 610, the complex I,Q signal can be split into two sliding windows with the same center. One window, labeled as an articulator band frequency window, can have a period $T_A$, where $T_A$=100 ms. A second window, labeled as a voice band analysis window, can have a period $T_V$, where $T_V \leq 50$ ms. The purpose of the two different periods is to develop frequency-domain features with window periods that are appropriate for lower frequencies, such as articulator motions in the longer window, and higher frequencies, such as skin and body tissue speech correlated vibrations in the shorter window.

In general, the articulator band and voice, or acoustic, band domains are separable at 50 Hz; however, there are exceptions. For example, for some words that have rapid lip movements and rapid mouth close/open cycles, that is the "pah" sound in the word "papa" generates some articulator frequency-domain transients spread across both bands. However, empirical measurements of the phenomenology suggest that much of the articulator information has support below <50 Hz. The result is that features developed exclusively from the articulator band can improve the isolated word classifier performance.

Figure 7:
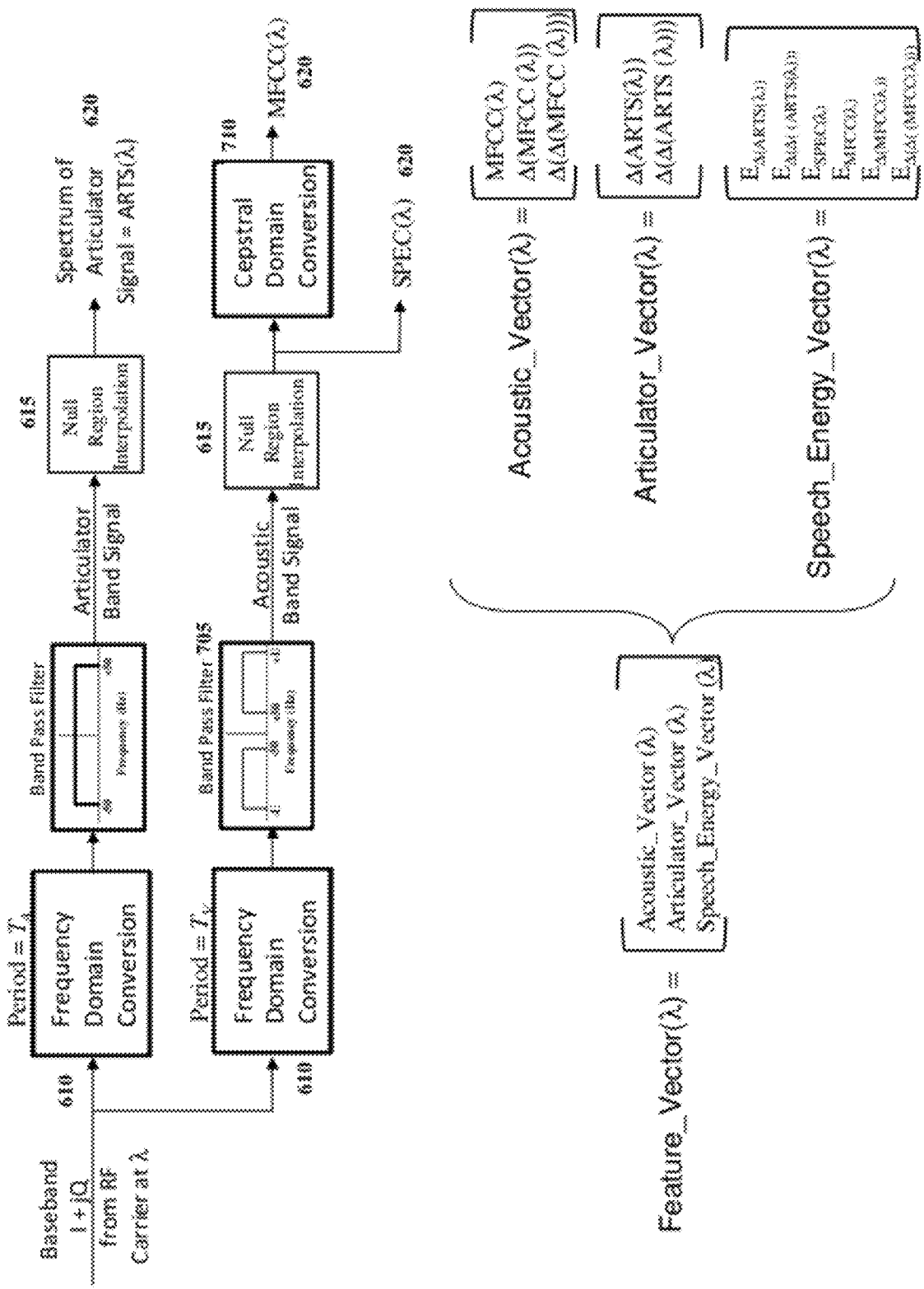
FIG. 7 is a block diagram representing the transformation of baseband coherent time-domain data into articulator and acoustic feature vectors in accordance with an exemplary embodiment of the invention.

FIG. 7 is a block diagram representing the transformation of baseband coherent time-domain data into articulator and acoustic feature vectors in accordance with an exemplary embodiment of the invention. More specifically, it represents further details of the 610, 615, and 620 functions of FIG. 6. In this embodiment, both frequency-domain transformations can include a time-domain window, typically Blackman-Harris, followed by a Fourier-domain transformation.

For the acoustic band signal, the data can be band pass filtered 705 from 50 Hz to U Hz. The U cutoff frequency can be selected based on the energy support associated with a specific human. For example, typically the value of U may vary from 1 KHz to 4 KHz. The Null Region Interpolation 615 can interpolate the spectral domain data across the ($t_{NULL\_START}$, $t_{NULL\_STOP}$) intervals to compensate for artifacts injected by the nulling signal. For feature extraction 620, the cepstral domain transformation 710 can include extraction of the Mel-scaled frequency cepstral coefficients (MFCCs). The MFCCs are extracted separately for both the upper and lower sidebands. The MFCC($\lambda$) vector can contain 13 MFCCs for the upper sideband, and 13 MFCCs for the lower sideband.

Feature extraction 620 of the articulator feature vector ARTS($\lambda$) can be created from band pass filtering the spectral-domain signal from −50 Hz to +50 Hz with 10 Hz resolution, and by taking the magnitude of the spectral coefficients. The "Null Region Interpolation" function 615 can perform the same operation as for the acoustic band signal to compensate for artifacts injected by the nulling signal.

Both the articular band analysis window and the voice band analysis windows can be shifted by 10 ms increments. Therefore, both the ARTS($\lambda$) and MFCC($\lambda$) feature vectors can be developed every 10 ms. The time differences are known one of ordinary skill in the art to improve classical acoustic speech recognition performance, which is also found to be true with the radar-derived data. When letting MFCC($\lambda$,t) be the MFCC($\lambda$) feature vector taken from a sample centered at time t, a similar definition is implied for ARTS ($\lambda$,t). The first and second time differences of the MFCC and ARTS feature vectors can be defined as:

$$\Delta(MFCC(\lambda),t)=MFCC(\lambda,t+dt_1)-MFCC(\lambda,t-dt_1)$$

$$\Delta(\Delta(MFCC(\lambda),t))=\Delta(MFCC(\lambda,t+dt_1))-\Delta(MFCC(\lambda,t-dt_1))$$

$$\Delta(ARTS(\lambda),t)=ARTS(\lambda,t+dt_2)-ARTS(\lambda,t-dt_2)$$

$$\Delta(\Delta(ARTS(\lambda),t))=\Delta(ARTS(\lambda,t+dt_2))-\Delta(ARTS(\lambda,t-dt_2))$$

where $dt_1$ and $dt_2$ are both typically 10 milliseconds. For notational convenience, $\Delta(MFCC(\lambda))$ can refer to time t, that is to $\Delta(MFCC(\lambda),t)$, and so on.

A vector that can estimate the log energy content of the feature vectors is defined next. The speech energy vector can be used for the detection of speech activity to isolate the feature vectors associated with vocalization opposed to the absence of speech. For each feature vector, the coefficient magnitudes can be squared then summed, and then a logarithm function can be applied. For example, $$E_{SPEC(\lambda)} = \log\left(\sum_i |f_i|^2\right)$$

where $f_i$ is the $i^{th}$ frequency coefficient of the SPEC($\lambda$) vector.

In summary, the aggregate feature vector can be a concatenation of a vector of information derived from the acoustic band, the articulator band, and the speech energy vector, as represented in FIG. 7.

Figure 8:
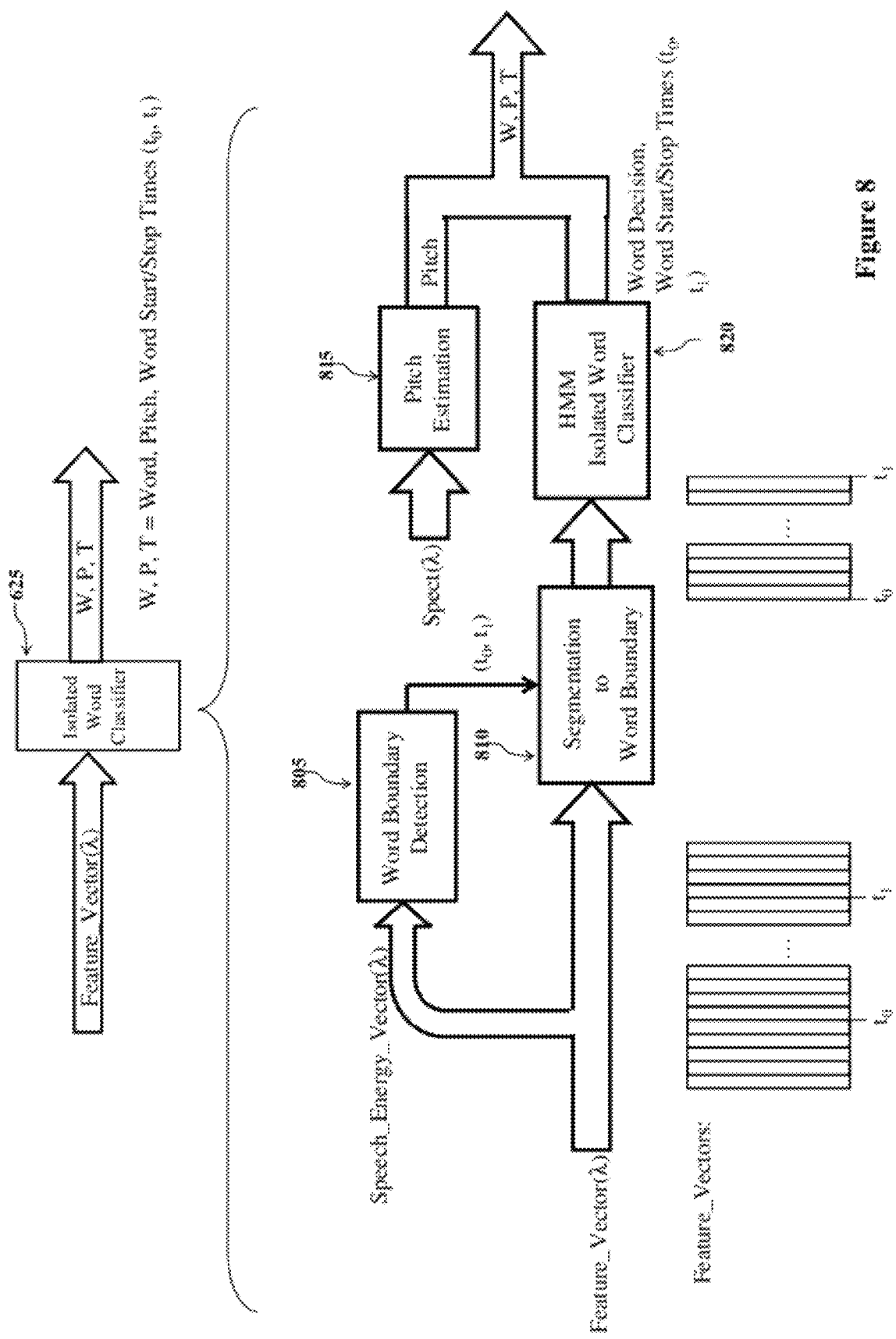
FIG. 8 is a block diagram of the isolated word classifier and its associated functions in accordance with an exemplary embodiment of the invention.

FIG. 8 is a block diagram of the isolated word classifier 625 and its associated functions in accordance with an exemplary embodiment of the invention. The isolated word classifier 625 can perform the sequence of operations: word boundary detection 805, word boundary segmentation 810, isolated word classification 820, and pitch estimation 815. In an exemplary embodiment, the speech energy vector can be used to determine word boundaries.

In an exemplary embodiment of the invention, the radar microphone system is trained with known ground truth. During this training, the feature vectors can be labeled with word present (intra-word times) and word absent (human is silent). The speech energy feature vectors can be used to train a Gaussian Mixture Model (GMM), contained in the word boundary detection module 805, to decide if speech energy is present, i.e., output=1, or absent, i.e., output=0. During speech recognition, the GMM can output a decision for each speech energy feature vector.

Figure 9:
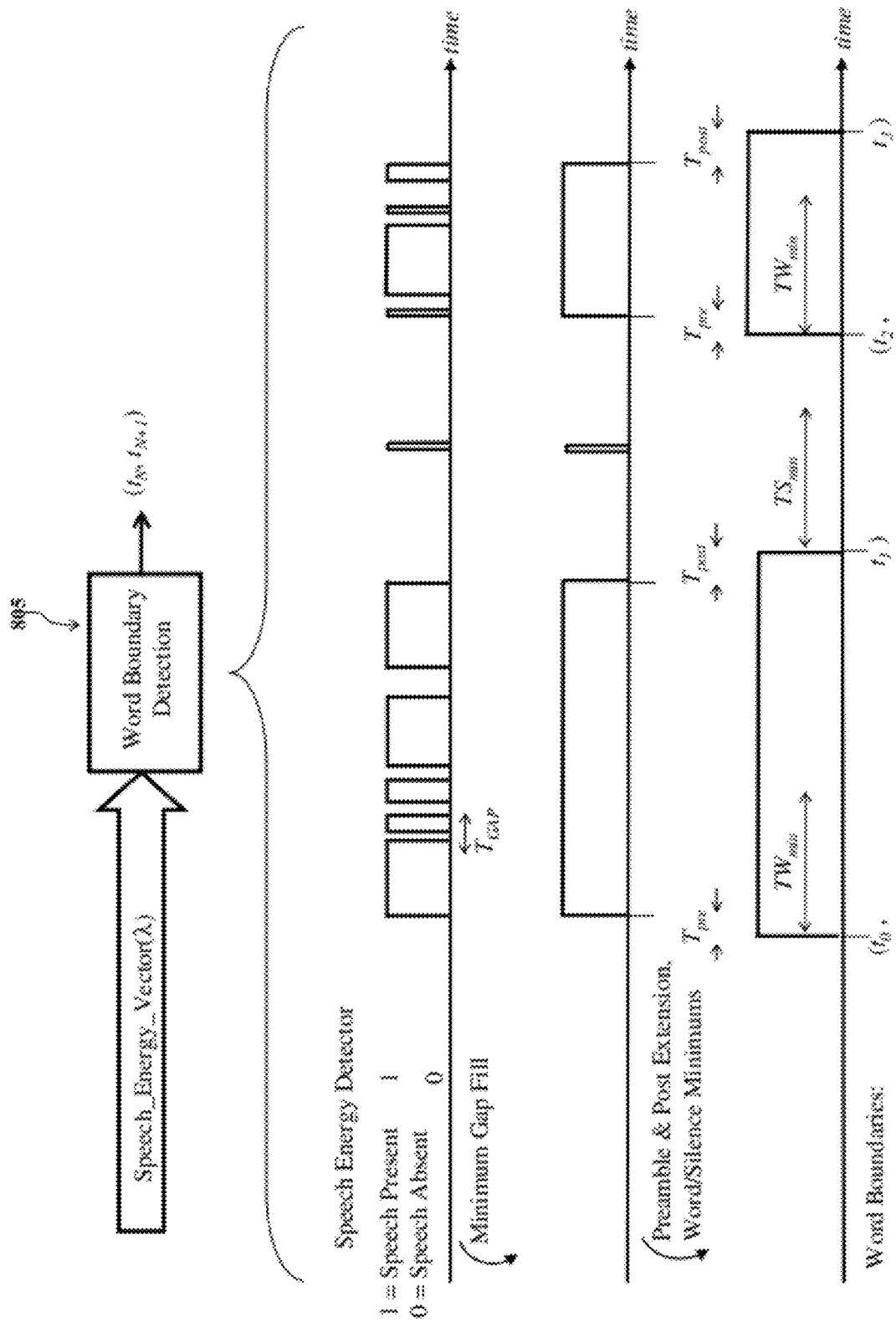
FIG. 9 is diagram representing a set of rules conducted by the word boundary detection module to determine if speech energy is present in accordance with an exemplary embodiment of the invention.

FIG. 9 is a diagram representing a set of rules conducted by the word boundary detection module 805 to determine if speech energy is present in accordance with an exemplary embodiment of the invention. The stream of binary decisions from the Gaussian Mixture Model can be put through a set of rules. The first rule is a minimum gap fill rule. The minimum gap fill rule is that all speech, absent regions less than $T_{gap}$, is set to speech present. A second rule adds a preamble and post-amble speech present period to the tentative word present region. A third rule retains only those word present periods with word duration in excess of $TW_{min}$, and simultaneously preceded and followed by word absent periods with a minimum of $TS_{min}$ duration. The variables $T_{gap}$, $T_{pre}$, $T_{post}$, $TS_{min}$, and $TW_{min}$ can be estimated from the statistics obtained during training with speaker dependent isolated word recitation. The results are a set of word boundary time intervals (t0, t1), (t2, t3), etc. that can be used during the segmentation process 810, which segments the input stream of feature_vectors to word boundaries.

Returning to FIG. 8, the speech recognition function 820 can start with a word segmented set of feature vectors. Speech recognition can be accomplished with 12 state whole word hidden Markov models (HMMs) with two mixture models per state, known to one of ordinary skill in the art. The initialization can be done with the Viterbi algorithm, and then maximum likelihood training with known ground truth can be accomplished with the Expectation-Maximization algorithm as known to one of ordinary skill in the art. Isolated word recognition can be accomplished by selecting the HMM path or states with the highest Viterbi score for the unknown set of word segmented feature vectors. The output of the isolated word classifier can be a word decision, such as ASCII, and digital words specifying the word's start and stop times (t0, t1).

The pitch estimation function 815 can estimate the pitch from the Spect($\lambda$) feature vector. The cepstrum can be calculated and then the peak signal can be located to determine the corresponding pitch period. The output can be a digital word containing the pitch period.

Figure 10:
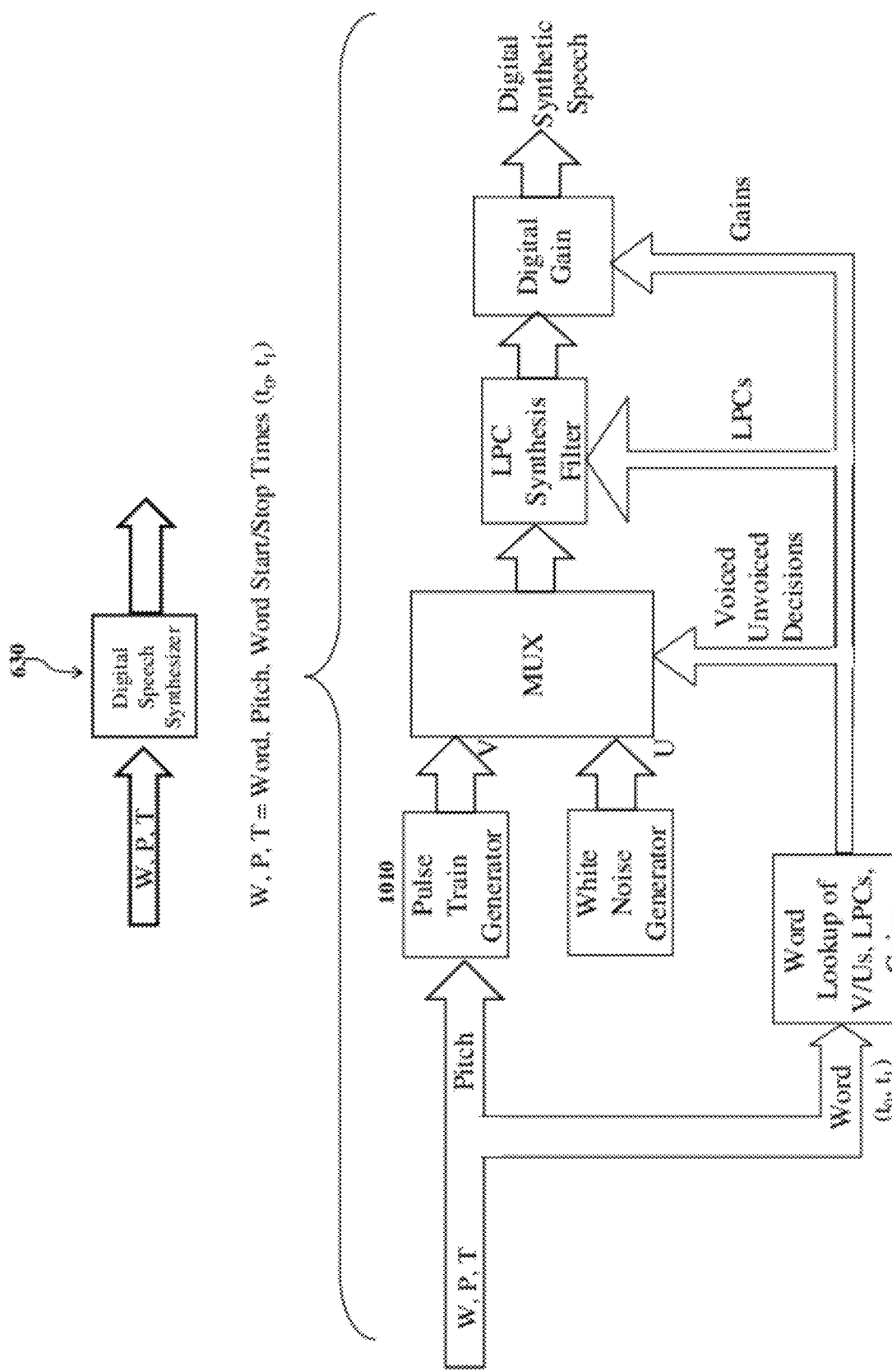
FIG. 10 is a block diagram of a digital speech synthesizer and its associated functions in accordance with an exemplary embodiment of the invention.

FIG. 10 is a block diagram of a digital speech synthesizer 630 and its associated functions in accordance with an exemplary embodiment of the invention. The digital speech synthesizer 630 can take the word decision, the word's pitch period, and the word's start and stop times from the isolated word classifier 625 to drive a digitized speech waveform generator. In one embodiment, the speech synthesizer 630 can be based on linear predictive coding, a simple model of the human vocal tract as known to one of ordinary skill in the art. In this embodiment, an estimate of the pitch period can drive a pulse train generator 1010. The word start/stop times can be utilized to interpolate the voiced/unvoiced decisions, the linear predictive coefficients (LPCs), and the gains to match the word duration derived from the radar baseband data.

Figure 11:
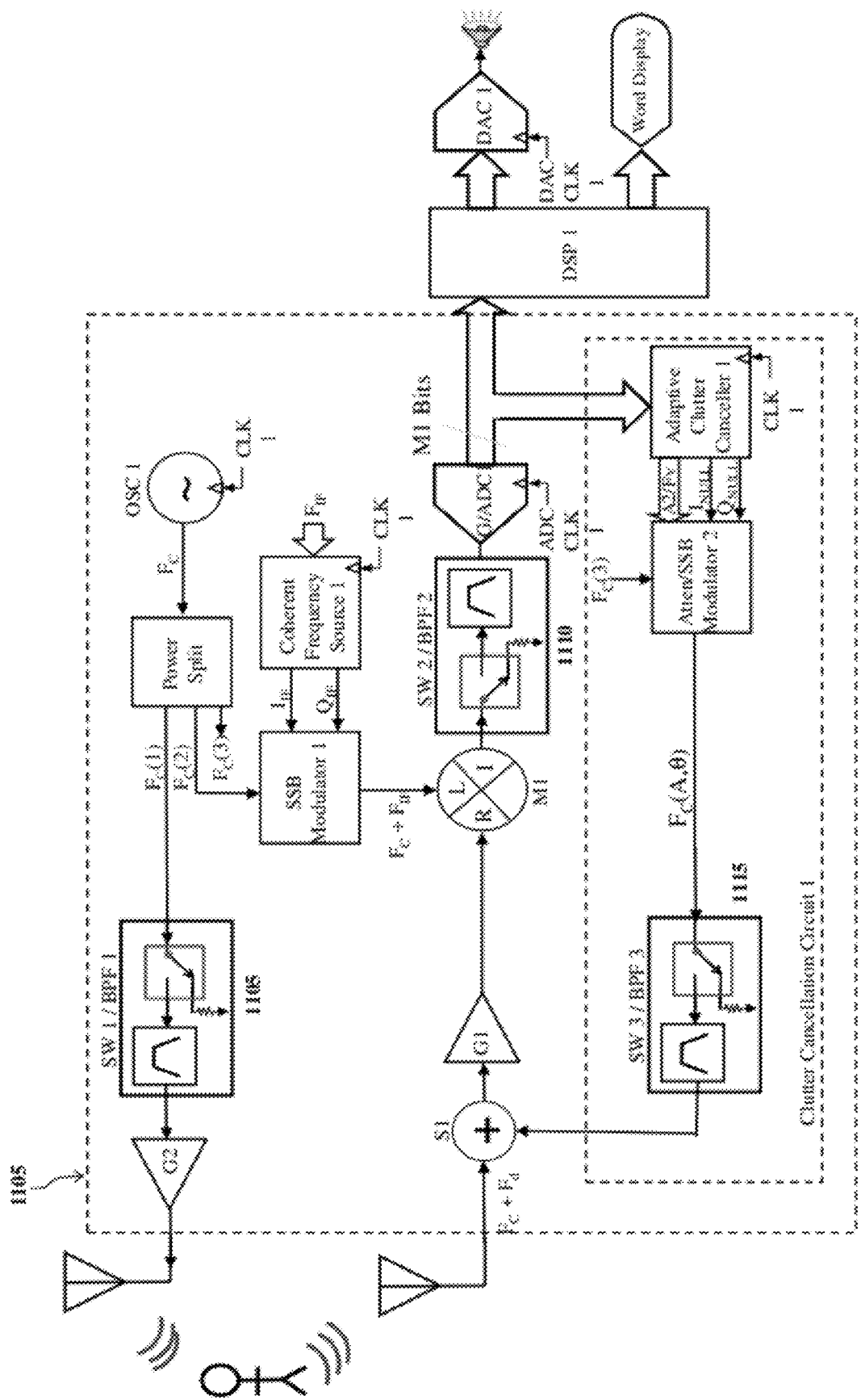
FIG. 11 is a block diagram of a short-pulse radar microphone in accordance with an alternative exemplary embodiment of the invention.

FIG. 11 is a block diagram of a short-pulse radar microphone in accordance with an alternative exemplary embodiment of the invention. FIG. 11 is a short-pulse variant of the radar microphone design represented in FIG. 3. More specifically, FIG. 11 represents an alternative embodiment of a R adar Microphone that employs a short-pulse, high-pulse-repetition frequency waveform as the transmit signal, which can be formed by a switch and band pass filter 1105. The switch and band bass filters 1110 and 1115 in the receiver can select RF signals containing speech-correlated information from a human in a specified range cell.

Figure 12:
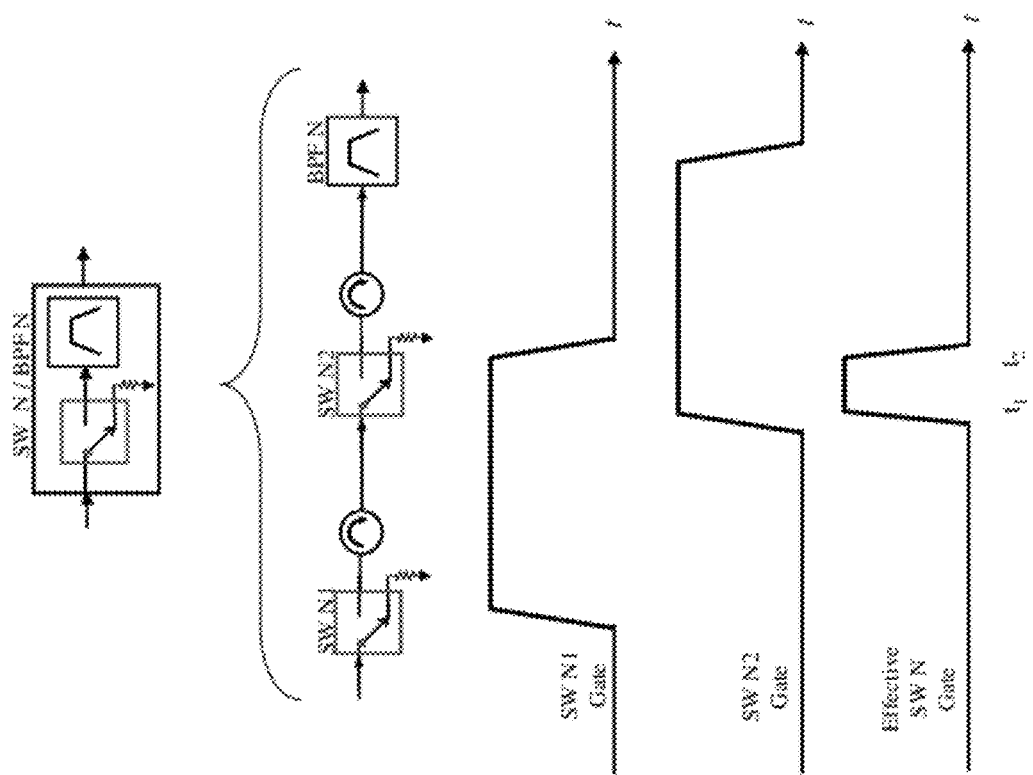
FIG. 12 is a circuit diagram of a timing gate in accordance with an exemplary embodiment of the invention.

In FIG. 11, the short-pulse transmit signal can be formed with the RF pin diode switch and band pass filter SW1/BPF1 1105. The receiver range gate can be established by the timing signals that drive SW2/BPF2 1110. The timing for gating the nulling signal, SW3/BPF3 1115, can be set so that the nulling gate slightly precedes and follows the time gates for SW2/BPF2 1110. This configuration can allow the nulling signal to be at steady state on the rising and falling edges of the SW2/BPF2 timing gate 1110. FIG. 12 is a circuit diagram of a switch and band pass filter function in accordance with an exemplary embodiment of the invention. Specifically, FIG. 12 reflects one embodiment of the switch and band pass filter function, i.e., SW N/BPF N, 1105, 1110, and 1115 of FIG. 11, which uses two relatively slow RF switches in series, to create a short pulse.

Figure 13:
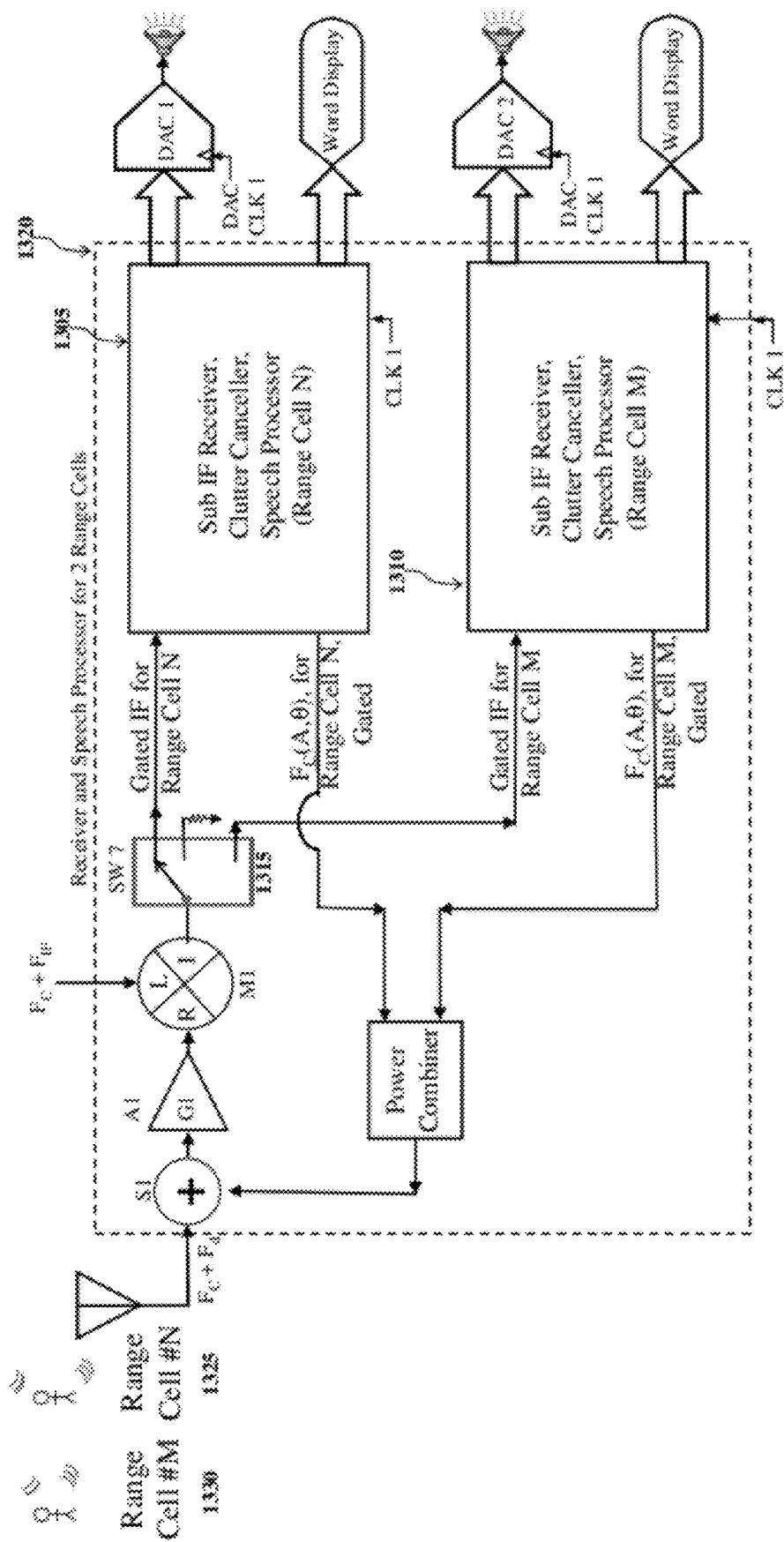
FIG. 13 is a circuit diagram representing a receiver circuit configured to recognize speech simultaneously from two vocalizing humans separated in range in accordance with an exemplary embodiment of the invention.

FIG. 13 is a circuit diagram representing a receiver circuit configured to recognize speech simultaneously from two vocalizing humans separated in range in accordance with an exemplary embodiment of the invention. The transmit waveform in FIG. 13 can be generated by the same short pulse method represented in FIG. 11. In FIG. 13, the human closer to the radar microphone 1325 is in range cell N, and the human more distant 1320 is in range cell M. The IF receiver and clutter canceller 1305 can correspond to range cell N, while IF receiver and clutter canceller 1310 can correspond to range cell M. Switch (SW 7) 1315 can direct the wideband IF signal between 1305 and 1310 so that the IF signal is at steady state within each range cell time interval.

Figure 14:
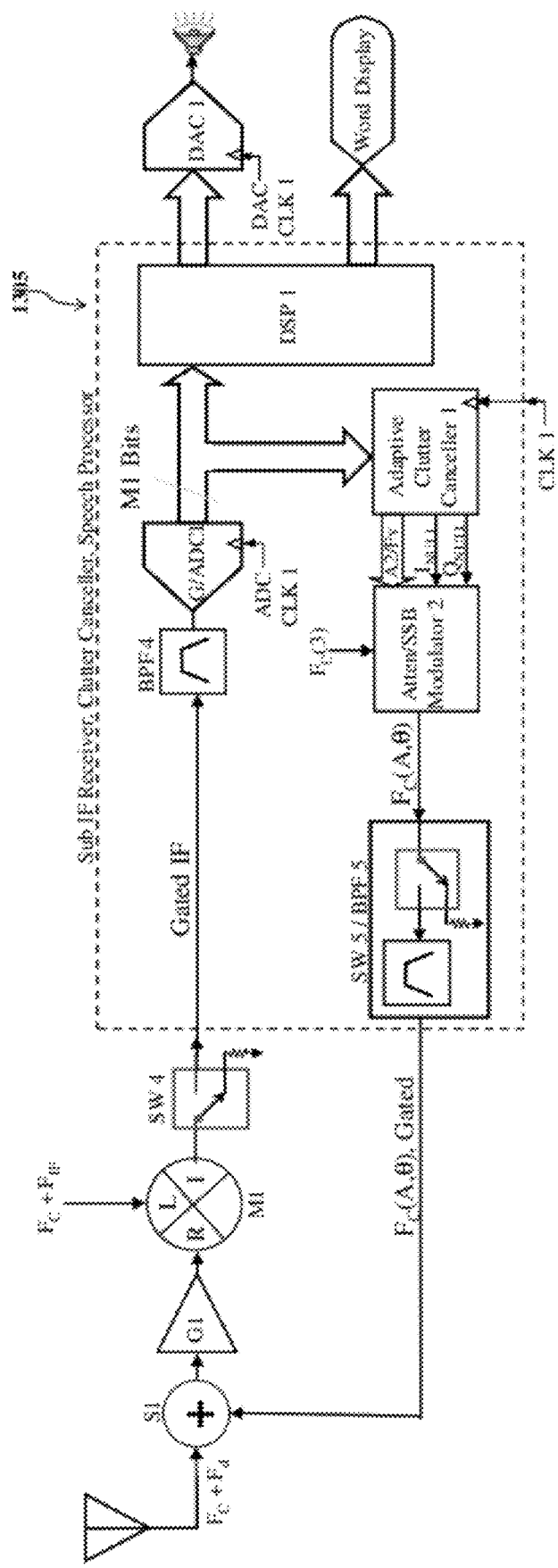
FIG. 14 is a circuit diagram of a short-pulse radar microphone receiver in accordance with an alternative exemplary embodiment of the invention.

FIG. 14 is a circuit diagram of a short-pulse radar microphone receiver in accordance with an alternative exemplary embodiment of the invention. More specifically, FIG. 14 is the same short pulse radar microphone receiver circuit of FIG. 11 with a segmentation of the "Sub IF Receiver, Clutter Canceller, and Speech Processor" circuits and functions grouped together as 1305. In fact, the components 1305 and 1310 as represented in FIG. 13 are the same as component 1305 in FIG. 14.

Figure 15:
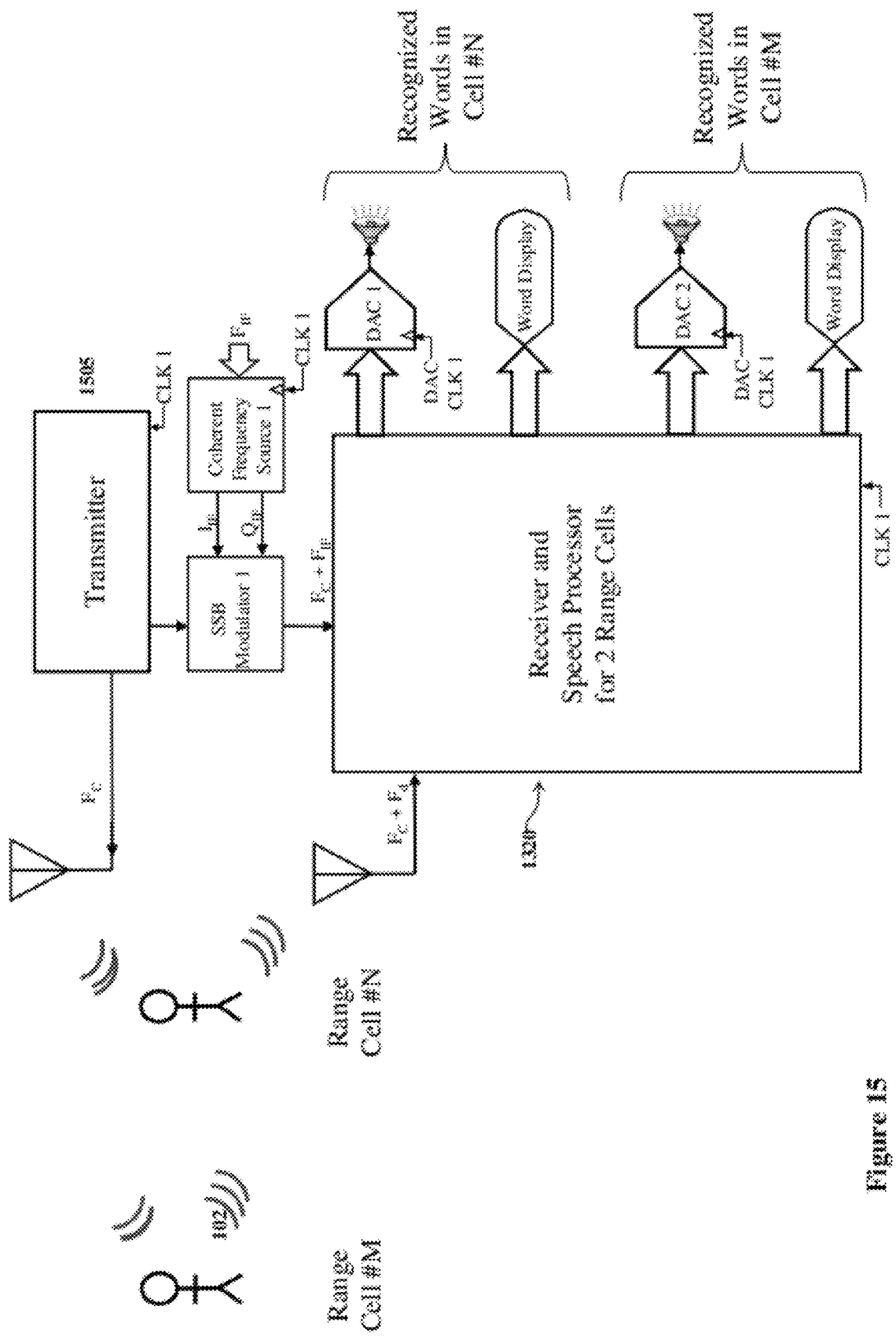
FIG. 15 is a system level diagram representing a short pulse waveform and a receiver circuit configured to recognize speech simultaneously from two vocalizing humans separated in range in accordance with an exemplary embodiment of the invention.

FIG. 15 is a system level diagram representing a short pulse waveform and a receiver circuit configured to recognize speech simultaneously from two vocalizing humans separated in range in accordance with an exemplary embodiment of the invention. FIG. 15 includes a transmitter circuit 1505, and component 1320 which contains the same "Receiver and Speech Processor for 2 Range Cells" as FIG. 13. The generalization of the circuit in FIG. 11 and FIG. 13 to more than two range cells follows by inspection.

Figure 16:
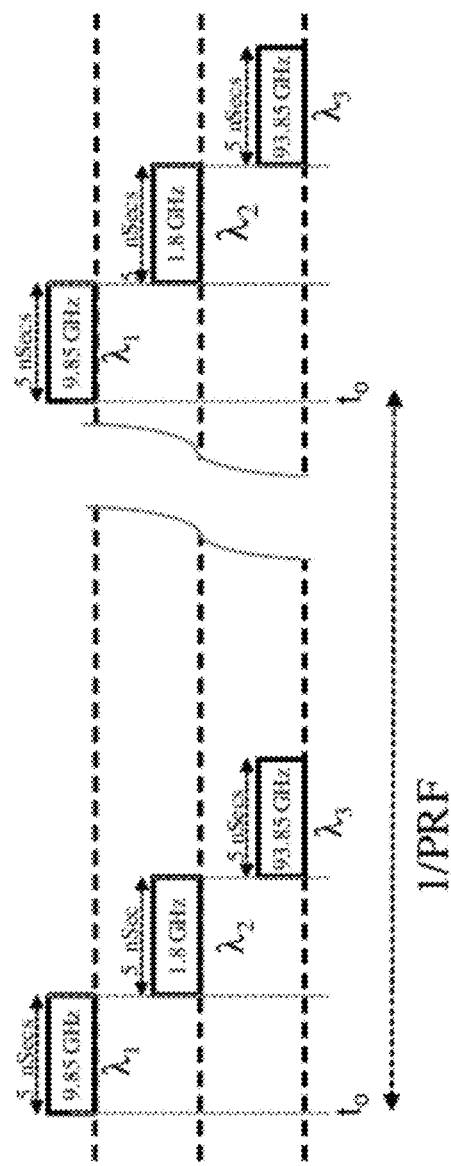
FIG. 16 is a diagram representing the transmit waveform in accordance with an exemplary embodiment of the invention.

In a preferred embodiment of the invention, the radar microphone system can be designed so that it supports simultaneous operation on multiple wavelengths. When the multiple wavelengths span two orders of magnitude, the opportunity to acquire independent samples with different phenomenology can be possible. The feature vector may then contain complementary information that enhances speech recognition performance. A multiple wavelength, i.e., three wavelength, design is represented in FIG. 1. The modules 115, 135, and 155 can each represent single-wavelength short-pulse transmitter and receiver modules as represented by 1105 in FIG. 11. In an exemplary embodiment of the invention, the implemented short-pulse tri-wavelength system can correspond to λ=17.7 cm (1.8 GHz), 3.0 cm (9.85 GHz), and 0.3 cm (93.85 GHz). FIG. 16 is a diagram representing the transmit waveform in accordance with an exemplary embodiment of the invention. The time stagger of each five nanosecond pulse is to minimize cross talk between the circuits for each wavelength.

Referring again to FIG. 1, the DSP 1 120, DSP 2 140, and DSP 3 160 modules can perform the initial direct conversion to baseband 605, i.e., I,Q direct sampling, frequency domain conversion 610, and null region interpolation 615 functions as described with respect to FIG. 6.

Figure 17:
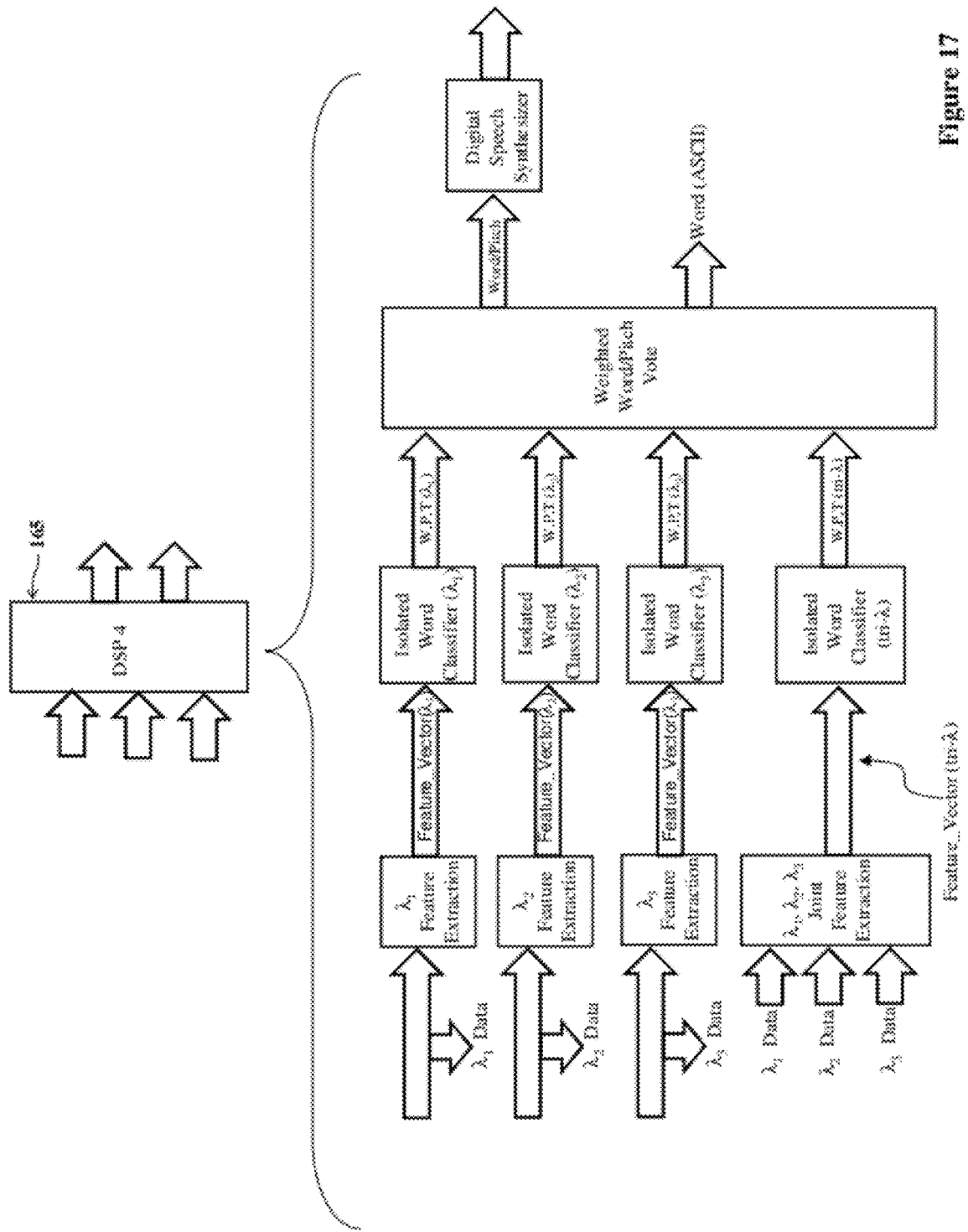
FIG. 17 is a block diagram representing the DSP feature extraction and word classification function in accordance with an exemplary embodiment of the invention.

FIG. 17 is a block diagram representing the DSP feature extraction 620 and word classification 625 functions in accordance with an exemplary embodiment of the invention. The DSP feature extraction 620 and word classification 625 functions can be performed in the DSP4 module 165 of FIG. 1, and as represented in FIG. 17. The feature vectors can be calculated separately for each wavelength, e.g., λ1, λ2, and λ3, and again as a joint feature vector, e.g., combination of λ1, λ2, and λ3. More specifically, the feature vectors can be partitioned into subsets of contiguous feature vectors associated with an isolated word by a word boundary algorithm. The word boundary algorithm can determine the start/stop times of an isolated word from statistics and rules derived from the energy measures.

Next, the four isolated word classifiers, i.e., one for each of the three wavelengths and a fourth for the joint feature vector, can each produce a word decision, pitch period estimate, and word start/stop times. More specifically, each word classifier can be realized as a HMM (Hidden Markov Model), which produces the word decision. A weighted decision of the word vote can determine the final word decision with an estimate of the pitch period and word start/stop times. The weight vector applied to the word decisions can be estimated from the training statistics.

The final word decision can then be sent as ASCII for visual display 220 or remote transmission. Since the raw baseband signal has low intelligibility for direct aural presentation, a synthesized speech signal can be generated instead. The word decision, estimated duration, and pitch can be used to drive a LPC based speech synthesizer as known to one of ordinary skill in the art. The pitch can be estimated from features associated with the winning word(s). The audible presentation 225 with preserved pitch can make it easier for the naive listener to associate the speech with a female or male.

Figure 18:
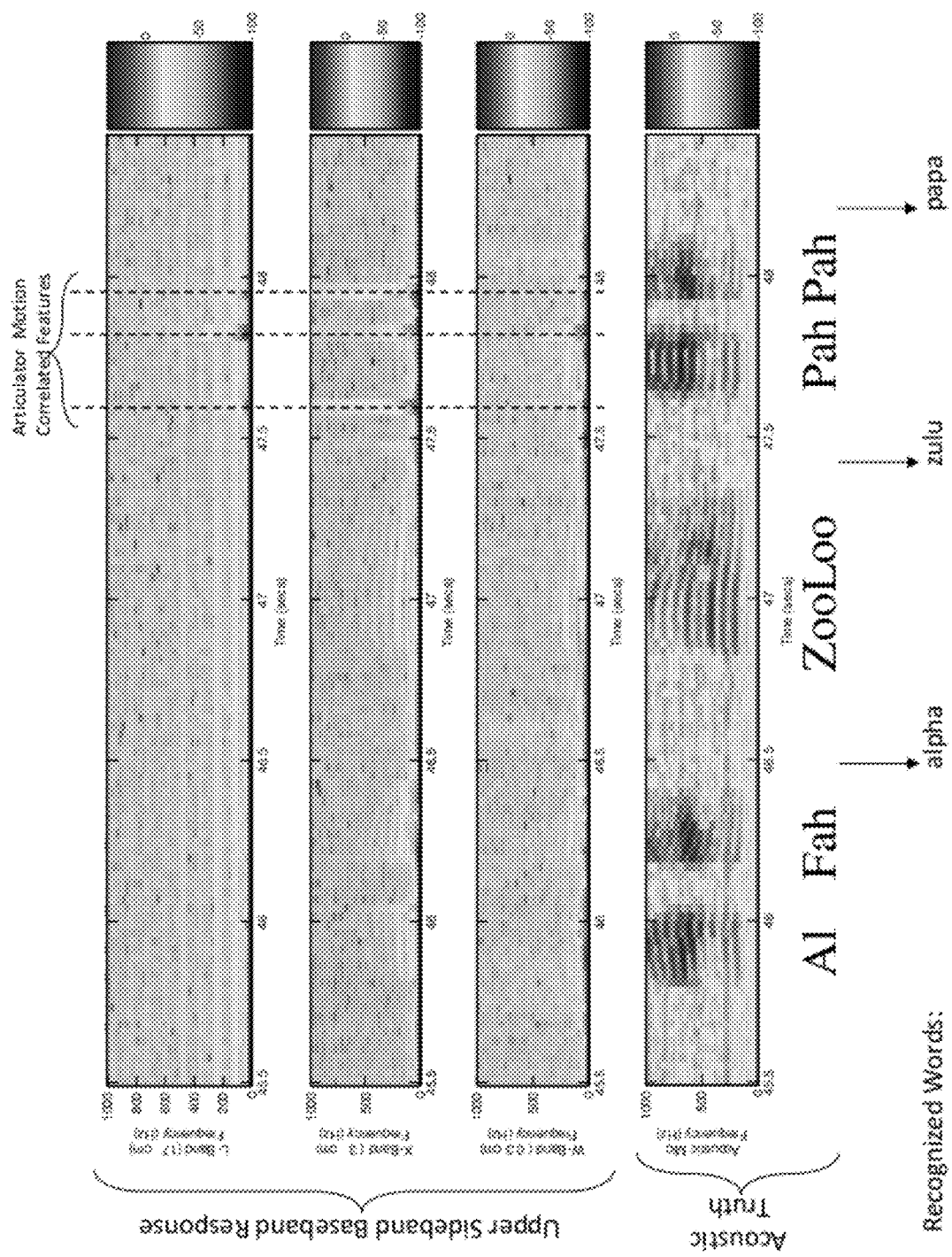
FIG. 18 represents RF domain spectra in the acoustic band from a tri-wavelength radar microphone system in accordance with an exemplary embodiment of the invention.

FIG. 18 represents RF domain spectra in the acoustic band from a three wavelength radar microphone system in accordance with an exemplary embodiment of the invention. The top three graphs in FIG. 18 represent the baseband spectrograms, after null region interpolation has been performed, of the upper sideband for the circuits corresponding to λ=17.7 cm, λ=3.0 cm, and λ=0.3 cm, respectively. The bottom graph represents a spectrogram of the acoustic ground truth recorded with an acoustic microphone. The machine recognized word decisions from the three wavelength radar microphone are represented at the bottom.

As noted with respect to FIG. 7, injection of the nulling signal can produce artifacts in the residue that are not part of the original speech signal. While null region interpolation is one strategy to mitigate these artifacts, another approach is to design the nulling circuit so that its loop bandwidth is much greater than the IF frequency used for speech analysis.

Figure 19:
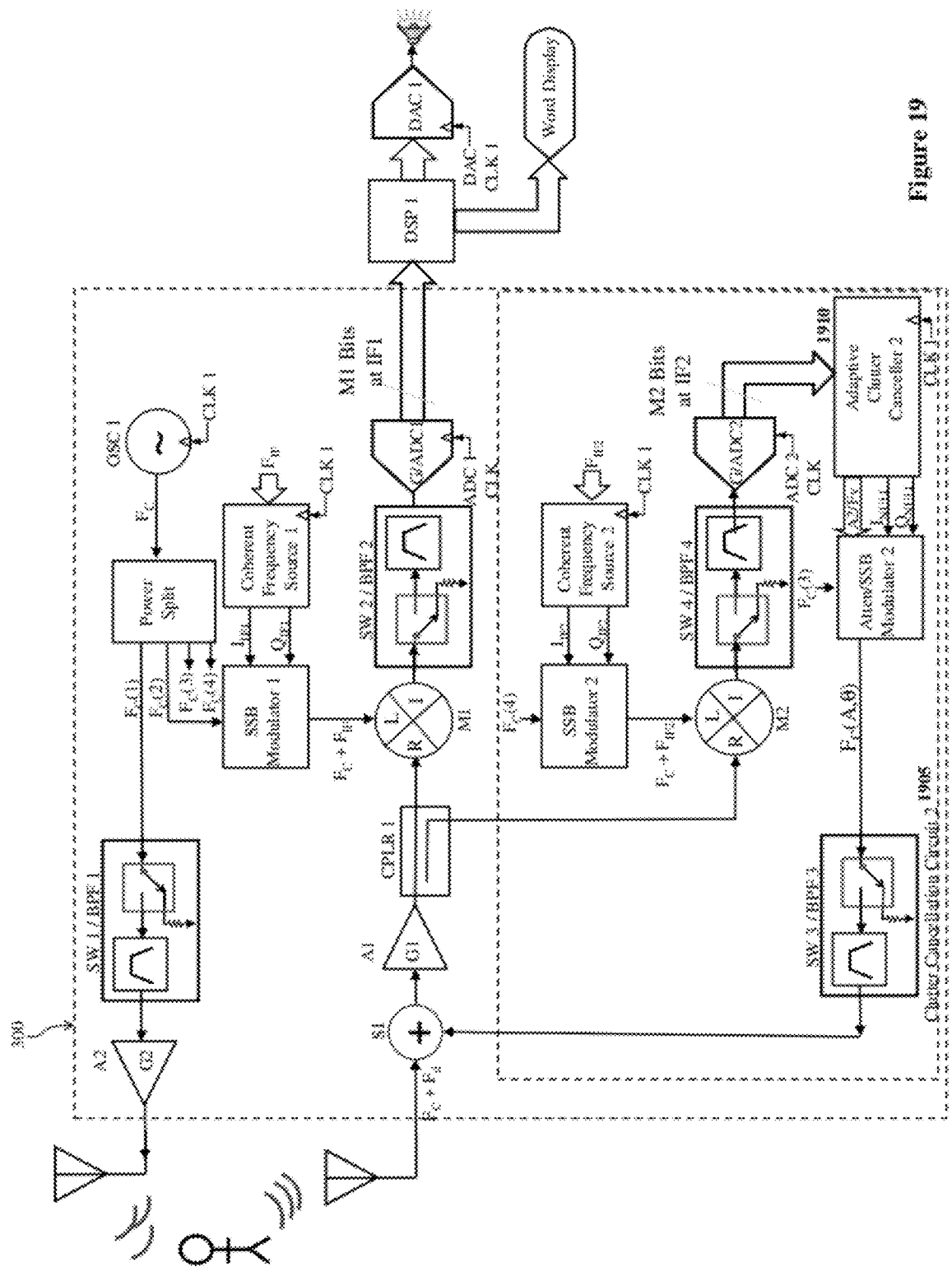
FIG. 19 is a circuit diagram representing a single-wavelength radar microphone design with a clutter nulling circuit of higher loop bandwidth in accordance with an alternative exemplary embodiment of the invention.

FIG. 19 is a circuit diagram representing a single-wavelength radar microphone design with a clutter nulling circuit of higher loop bandwidth in accordance with an alternative exemplary embodiment of the invention. The IF1 frequency is typically low, e.g., 24 kHz, which can permit direct conversion to (I,Q) with high dynamic range sampling of the residue signal for speech analysis (M1 bits at IF1). The Clutter Cancellation Circuit 2 1905 operates at a higher IF2 frequency than the Clutter Cancellation Circuit 1 of F1G. 11, where IF2>>IF1. The higher IF2 frequency cannot be sampled with the same dynamic range (M2 bits<M1 bits) as the residue signal for speech analysis; however the goal of the analysis of the signal at IF2 is merely to estimate the clutter signal power only. Thus a digital filter in the adaptive clutter canceller 2, 1910, with reduced frequency resolution and latency, can be used to estimate the strong clutter signal at IF2. The net result is that the Coarse/Fine spiral scan at the higher loop bandwidth can complete in less time reducing the duration of the null region interpolation period.

It should be understood that the foregoing relates only to illustrative embodiments of the present invention, and that numerous changes may be made therein without departing from the scope and spirit of the invention as defined by the following claims.

The invention claimed is:

1. A method for detecting and recognizing speech, comprising the steps of:
   remotely detecting body motions from a speaker during vocalization with one or more radar sensors supporting a plurality of simultaneous diverse wavelengths, wherein the body motions comprise small vibrational displacements and articulator motions;
   extracting Doppler signals correlated with the speaker vocalization;
   developing feature vectors utilizing the vocalization Doppler signals; and
   recognizing words associated with the feature vectors with a word classifier.

2. The method of claim 1, wherein the step of detecting body motions from a speaker during vocalization with one or more radar sensors, comprises the steps of:
   transmitting the plurality of diverse wavelengths;
   transmitting one or more waveforms with a transmit aperture towards the speaker during vocalization, each of the waveforms having a distinct wavelength;
   receiving scattered radio frequency energy from the speaker with a receiver aperture for each diverse wavelength; and
   converting the scattered radio frequency energy to an intermediate frequency.

3. The method of claim 2, wherein the waveforms are short pulse waveforms.

4. The method of claim 1, wherein the step of extracting Doppler signals correlated with the vocalization, comprises the steps of:
   converting scattered radio frequency energy from body motions into an intermediate frequency in a receiver at each diverse wavelength;
   summing the intermediate frequency with a clutter nulling feedback circuit to attenuate clutter signals, wherein the clutter signals comprise signals correlated to non-vocalizing body motions; and
   transmitting the remaining Doppler signals correlated to the speaker vocalization to a signal processor.

5. The method of claim 4, wherein the step of attenuating the clutter signals with a clutter nulling feedback circuit, comprising the steps of:
   adapting the dynamic range of the clutter nulling circuit to an interfering signal level while the clutter nulling circuit is operating with the receiver in non-linear saturation;
   searching a non-convex null space of the receiver for a bowl where the receiver behaves linearly; and
   locating a region within the bowl that maximizes the clutter attenuation.

6. The method of claim 1, wherein the step of developing feature vectors utilizing the vocalization Doppler signals, comprises the steps of:
   for each wavelength utilized by the radar sensor in detecting the body motions of the speaker, converting the vocalization Doppler signals to an acoustic vector, articulator vector, and a speech energy vector;
   creating a separate feature vector for each wavelength based on a concatenation of a vector of information derived from the acoustic vector, articulator vector, and the speech energy vector;
   creating a joint feature vector based on a combination of the acoustic vectors, articulator vectors, and the speech energy vectors of each wavelength; and
   transmitting the feature vectors to the word classifier.

7. The method of claim 6, where the word decision data comprises a word decision, a pitch period estimate, and a word start and stop times.

8. The method of claim 6, wherein the step of utilizing a word classifier for each feature vector to produce word decision data comprises the step of utilizing a Hidden Markov Model to produce the word decision.

9. The method of claim 6, further comprising the step of forming separate, co-centered sliding analysis widows with different periods, wherein one of the sliding analysis windows is for an articulator band and one of the sliding analysis windows is for a voice band.

10. The method of claim 1, wherein the step of recognizing words associated with the feature vectors with a word classifier, comprises the steps of:
   partitioning the feature vectors into subsets of contiguous feature vectors associated with an isolated word with a word boundary algorithm, wherein the word boundary algorithm determines the start and stop times of an isolated word from statistics and rules;
   utilizing a word classifier for each feature vector to produce word decision data;
   weighting the word decision data of each word classifier to determine the final word decision data.

11. The method of claim 1, further comprising the step of visually or aurally presenting the word decision.

12. The method of claim 1, further comprising the steps of:
   cancelling signals correlated to non-vocalizing body motions and background clutter for each diverse wavelength; and
   interpolating the signals across an interval during which a cancellation circuit was active for each diverse wavelength.

13. A speech detection and recognition system, comprising:
   one or more radar sensors supporting a plurality of simultaneous diverse wavelengths configured to remotely detect body motions from a speaker during vocalization and to extract Doppler signals correlated with the speaker vocalization, wherein the body motions comprise small vibrational displacements and articulator motions;
   one or more radar digital signal processors, connected to the radar sensors, and configured to develop feature vectors utilizing the vocalization Doppler signals; and
   one or more radar word classifiers configured to recognize words associated with the feature vectors.

14. The system of claim 13, wherein the radar sensors further comprise:
   a transmit aperture connected to the radar sensor configured to transmit one or more waveforms towards a speaker during vocalization, each of the waveforms having a distinct wavelength; and
   a receiver aperture connected to the radar sensor configured to receive scattered radio frequency energy generated by the body motions from the speaker.

15. The system of claim 14, wherein the waveforms are short pulse waveforms.

16. The system of claim 13, wherein the radar sensor further comprises:
   a receiver configured to convert scattered radio frequency energy from the body motions into an intermediate frequency; and
   a clutter nulling feedback circuit configured to receive the intermediate frequency from the receiver and to attenuate clutter signals.

17. The system of claim 16, wherein the clutter nulling feedback circuit is further configured to adapt the dynamic range of the clutter nulling circuit to an interfering signal level while the clutter nulling circuit is operating with the receiver in non-linear saturation; search a non-convex null space of the receiver for a bowl where the receiver behaves linearly with a wide bandwidth feedback loop; and locate a region within the bowl that maximizes the clutter attenuation.

18. The system of claim 13, wherein the digital signal processors are further configured to convert the vocalization Doppler signals to an acoustic vector, articulator vector, and a speech energy vector for each wavelength utilized by the radar sensor in detecting the body motions of the speaker; create a separate feature vector for each wavelength based on a concatenation of a vector of information derived from the acoustic vector, articulator vector, and the speech energy vector; create a joint feature vector based on a combination of the acoustic vectors, articulator vectors, and the speech energy vectors of each wavelength; and transmit the feature vectors to the word classifier.

19. The system of claim 18, where the word decision data comprises a word decision, a pitch period estimate, and a word start and stop times.

20. The system of claim 18, wherein the word classifiers are configured to produce word decision data by utilizing a Hidden Markov Model.

21. The system of claim 18, further comprising:
   a word display configured to visually present the final word decision; and a speech synthesizer configured to audibly present the final word decision.

22. The system of claim 13, wherein the word classifiers are further configured to partition the feature vectors into subsets of contiguous feature vectors associated with an isolated word with a word boundary algorithm, wherein the word boundary algorithm determines the start and stop times of an isolated word from statistics and rules; produce word decision data; and weight the word decision data of each word classifier to determine the final word decision data.

* * * * *